(12) United States Patent
Ross et al.

(10) Patent No.: US 12,447,185 B2
(45) Date of Patent: Oct. 21, 2025

(54) GABA-PRODUCING CULTURABLE BACTERIA AND USE FOR IMPROVING HEALTH

(71) Applicants: University College Cork—National University of Ireland, Cork, Cork (IE); TEAGASC—THE AGRICULTURE AND FOOD DEVELOPMENT AUTHORITY, Carlow (IE)

(72) Inventors: Paul Ross, Co. Cork (IE); Catherine Stanton, Co. Cork (IE)

(73) Assignees: UNIVERSITY COLLEGE CORK—NATIONAL UNIVERSITY OF IRELAND, CORK, Cork (IE); TEAGASC—THE AGRICULTURE AND FOOD DEVELOPMENT AUTHORITY, Carlow (IE)

( * ) Notice: Subject to any disclaimer, the term of this patent is extended or adjusted under 35 U.S.C. 154(b) by 823 days.

(21) Appl. No.: 17/614,982

(22) PCT Filed: May 30, 2020

(86) PCT No.: PCT/EP2020/065101
§ 371 (c)(1),
(2) Date: Nov. 29, 2021

(87) PCT Pub. No.: WO2020/240033
PCT Pub. Date: Dec. 3, 2020

(65) Prior Publication Data
US 2022/0249582 A1 Aug. 11, 2022

Related U.S. Application Data

(60) Provisional application No. 62/854,706, filed on May 30, 2019.

(30) Foreign Application Priority Data

May 30, 2019 (EP) ..................................... 19177554

(51) Int. Cl.
*A61K 35/747* (2015.01)
*A23L 33/00* (2016.01)
*A23L 33/135* (2016.01)
*A61P 3/04* (2006.01)
*A61P 3/10* (2006.01)
*A61P 25/24* (2006.01)

(52) U.S. Cl.
CPC .......... *A61K 35/747* (2013.01); *A23L 33/135* (2016.08); *A23L 33/40* (2016.08); *A61P 3/04* (2018.01); *A61P 3/10* (2018.01); *A61P 25/24* (2018.01); *A23V 2002/00* (2013.01); *A23V 2400/121* (2023.08)

(58) Field of Classification Search
CPC ..... A61K 35/747; A23L 33/135; A23L 33/40; A23L 2/38; A23L 2/39; A23L 2/52; A61P 3/04; A61P 3/10; A61P 25/24; A61P 1/00; A23V 2002/00; A23V 2400/121; C12N 1/20
See application file for complete search history.

(56) References Cited

FOREIGN PATENT DOCUMENTS

| WO | WO-2012/024638 A2 | 2/2012 |
| WO | WO-2013/107913 A1 | 7/2013 |
| WO | WO-2010/146568 A2 | 12/2020 |

OTHER PUBLICATIONS

Barrett et al "Aminobutyric Acid Production by Culturable Bacteria From the Human Intestine" Journal of Applied Microbiology vol. 113, pp. 411-417, 2012.

Marques et al "Influence of GABA and GABA-Producing *Lactobacillus brevis* DPC 6108 on the Development of Diabetes in a Streptozotocin Rat Model" Beneficial Microbes vol. 7, pp. 409-420, 2016.

*Primary Examiner* — Kade Ariani
(74) *Attorney, Agent, or Firm* — Morse, Barnes-Brown & Pendleton, P.C.; Martin Z. Zhang, Esq.; Russell L. Widom

(57) ABSTRACT

A composition for use in a method of regulating or treating a metabolic disease or a symptom thereof, the composition comprising an isolated bacteria *Lactobacillus brevis* (DPC6108) deposited with the National Collection of Industrial and Marine Bacteria Limited (NCIMB) on 28 Nov. 2011 and accorded the accession number NCIMB 41903.

11 Claims, 20 Drawing Sheets
Specification includes a Sequence Listing.

SEQUENCE LISTING

```
<160> NUMBER OF SEQ ID NOS: 3

<210> SEQ ID NO 1
<211> LENGTH: 1396
<212> TYPE: DNA
<213> ORGANISM: Lactobacillus brevis
<220> FEATURE:
<221> NAME/KEY: misc_feature
<222> LOCATION: (1)..(1396)
<223> OTHER INFORMATION: 16S rRNA
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (23)..(23)
```

<223> OTHER INFORMATION: n is a, c, g, or t
<220> FEATURE:
<221> NAME/KEY: misc_feature
<222> LOCATION: (1390)..(1390)
<223> OTHER INFORMATION: n is a, c, g, or t

<400> SEQUENCE: 1

```
natgacgtgc ttgcactgat ttnaacaatg aagcgagtgg cgaactggtg agtaacacgt      60
gggaaatctg cccagaagca ggggataaca cttggaaaca ggtgctaata ccgtataaca     120
acaaaatccg catggatttt gtttgaaagg tggcttcggc tatcacttct ggatgatccc     180
gcggcgtatt agttagttgg tgaggtaaag gcccaccaag acgatgatac gtagccgacc     240
tgagagggta atcggccaca ttgggactga gacacggccc aaaytcctac gggaggcagc     300
agtagggaat cttccacaat ggacgaaagt ctgatggagc aatgccgcgt gagtgaagaa     360
gggtttcggc tcgtaaaact ctgttgttaa agaagaacac ctttgagagt aactgttcaa     420
gggttgacgg tatttaacca gaaagccacg gctaactacg tgccagcagc cgcggtaata     480
cgtaggtggc aagcgttgtc cggatttatt gggcgtaaag cgagcgcagg cggtttttta     540
agtctgatgt gaaagccttc ggcttaaccg gagaagtgca tcggaaactg ggagacttga     600
gtgcagaaga ggacagtgga actccatgtg tagcggtgga atgcgtagat atatggaaga     660
acaccagtgg cgaaggcggc tgtctagtct gtaactgacg ctgaggctcg aaagcatggg     720
tagcgaacag gattagatac cctggtagtc catgccgtaa acgatgagtg ctaagtgttg     780
gagggttttcc gcccttcagt gctgcagcta acgcattaag cactccgcct ggggagtacg     840
accgcaaggt tgaaactcaa aggaattgac ggggcccgc acaagcggtg gagcatgtgg     900
tttaattcga agctacgcga agaaccttac caggtcttga catcttctgc caatcttaga     960
gataagacgt tcccttcggg gacagaatga caggtggtgc atggttgtcg tcagctcgtg    1020
tcgtgagatg ttgggttaag tcccgcaacg agcgcaaccc ttattatcag ttgccagcat    1080
tcagttgggc actctggtga gactgccggt gacaaaccgg argaaggtgg ggatgacgtc    1140
aaatcatcat gccccttatg acctgggcta ccaccgtgct acaatggacg gtacaacgag    1200
tcgcgaagtc gtgaggctaa gctaatctct taaagccgtt ctcagttcgg attgtaggct    1260
gcaactcgcc tacatgaagt tggaatcgct agtaatcgcg gatcagcatg ccgcggtgaa    1320
tacgttcccg ggccttgtac acaccgcccg tcacaccatg agagtttgta acacccaaag    1380
ccggtgagan acctcg                                                    1396
```

<210> SEQ ID NO 2
<211> LENGTH: 17
<212> TYPE: DNA
<213> ORGANISM: Artificial Sequence
<220> FEATURE:
<223> OTHER INFORMATION: Forward Primer
<220> FEATURE:
<221> NAME/KEY: misc_feature
<222> LOCATION: (9)..(9)
<223> OTHER INFORMATION: n is a, c, g, or t

<400> SEQUENCE: 2

```
cctacgggng gcwgcag                                                     17
```

<210> SEQ ID NO 3
<211> LENGTH: 21
<212> TYPE: DNA
<213> ORGANISM: Artificial Sequence
<220> FEATURE:
<223> OTHER INFORMATION: reverse primer

```
<220> FEATURE:
<221> NAME/KEY: misc_feature
<222> LOCATION: (7)..(7)
<223> OTHER INFORMATION: n is a, c, g, or t

<400> SEQUENCE: 3
gactacnvgg gtwtctaatc c                                              21
```

GABA-PRODUCING CULTURABLE BACTERIA AND USE FOR IMPROVING HEALTH

FIELD OF THE INVENTION

The invention relates to improving health of an individual through the gut microflora. Specifically, the invention relates to a GABA-producing bacterial strain its use in improving health through improving the gut microflora.

BACKGROUND TO THE INVENTION

Metabolic surgery is currently the most effective therapy for morbid obesity and associated metabolic disturbances. Failure in compliance for changing poor lifestyle habits has rendered the global population susceptible to the pandemic of obesity and insulin resistance. This has driven the demand for researchers to investigate novel, non-invasive preventative therapies for obesity and associated disorders. The vast amount of emerging literature describing the biological significance of the gut microbiome is both relevant and significant to health. Sequencing technologies and germ-free murine models have highlighted the role of the gut microbiome in metabolism, social development and immunity. Murine and clinical studies have demonstrated the impact of lifestyle factors such as diet, exercise, antibiotic use, age and bowel disorders on the composition and diversity of intestinal microbial inhabitants and metabolic health in humans. It is long known that the composition and diversity of the gut microbiota are very different between healthy subjects and those with obesity. Thus, the gut microbiota has become a popular target for novel anti-obese and anti-diabetic therapies, one which by-passes the need for lifestyle changes and/or surgery.

Consumption of a high-fat diet and increased energy intake predisposes mice and humans to a low-grade inflammation and insulin resistance. Circulating molecules of bacterial origin, such as, but not limited to lipopolysaccharide (LPS) are increased following the onset of obesity and trigger the host inflammatory immune response in tissues such as the liver and adipose tissue. Furthermore, mice subcutaneously infused with LPS are susceptible to weight gain and metabolic inflammation. The gut microbial profile of obesity contains decreased proportions of *Bifidobacterium* which have been shown to reduce intestinal LPS and improve gut barrier function. It is therefore tangible that the links between increased energy consumption, changes in the composition of the gut microbiota, metabolic endotoxaemia and metabolic syndrome could be directed through LPS-dependent disruptions in intestinal barrier function.

Some probiotics have proven efficacy in improving glucose tolerance and weight gain in pre-clinical and clinical studies. As such, they should be considered adjunct therapies. Of particular interest has been the inverse correlation between the species abundance of *Akkermansia muciniphila* and obesity and diabetes. Obese and diabetic db/db mice treated with *E. halli* demonstrated improved insulin sensitivity and increased energy expenditure, compared with control treatment. *Bifidobacterium animalis* ssp. lactis 420 has been shown to reduce fat mass and glucose intolerance in obese and diabetic mice through reducing intestinal mucosal adherence of *Escherichia coli* and plasma LPS levels.

Peripheral inflammation associated with obesity and metabolic syndrome enhances the risk for neuropsychiatric and neurological disorders such as depression, anxiety, cognitive impairments, stroke and Alzheimer's disease. It has been shown that obese and type-2-diabetic (db/db) mice display enhanced anxiety-like behaviour and impaired hippocampal dependent spatial recognition memory. The gut microbiota has been shown to impact on mood and behaviour. Probiotic manipulation of the gut microbiota can improve depressive- and anxiety-like behaviours and enhance cognitive processing in mice and in humans. In addition, probiotics can impact on central nervous system neurotransmitter signalling involved in the regulation of physiological and psychological processes. For example, γ-aminobutyric acid (GABA) is the main inhibitory neurotransmitter in the brain and alterations in central GABA receptor expression are implicated in anxiety and depression. Supplementing mice with *Lb. rhamnosus* JB-1 reduced stress-induced corticosterone and anxiety and depression-related behaviours in mice. These behavioural effects correlated with neurochemical changes through GABA receptor subunit signalling in brain regions.

Marques™ et al ((2016) Influence of GABA and GABA-producing *Lactobacillus brevis* DPC 6108 on the development of diabetes in a streptozotocin rat model. Beneficial Microbes 7(3):409-420) describes that *L. brevis* DPC 6108 supplementation was associated with increased serum insulin levels (P<0.05), but did not alter other metabolic markers in healthy rats. The WO 2013/107913 A1 publication discloses the use of *L. brevis* DPC 6108 in treating dysregulated blood pressure.

It is an object of the subject application to overcome at least one of the above-mentioned problems.

SUMMARY OF THE INVENTION

With scientific breakthroughs now emerging on alternative, natural therapeutics for the treatment of diabetes, through manipulation of the gut microbiota, probiotics appear to be at the forefront of a new era of preventative natural medication. The inventors have previously isolated *Lb. brevis* DPC6108 from an infant fecal sample and *Lb. brevis* DSM32386 from a traditional Italian cheese, and demonstrated their ability to produce GABA in vitro. They have demonstrated the ability of *Lb. brevis* DPC6108 to alter the metabolic and behavioural profile of healthy mice. The results presented herein demonstrate that daily oral administration of *Lactobacillus brevis* improves insulin sensitivity in a diet-induced obesity rodent model. The objective of the invention was to identify whether microbial GABA production can improve the impaired metabolic profile of chronically high fat-fed mice and improve the neuropsychiatric impairment associated with metabolic syndrome.

According to an aspect of the present invention, there is provided, as set out in the appended claims, a composition for use in a method of regulation or treatment of metabolic disease or symptoms thereof, the composition comprising an isolated bacteria *Lactobacillus brevis* (DPC6108) deposited under the terms of the Budapest Treaty on the International Recognition of the Deposit of Microorganisms for the Purposes of Patent Procedure with the International Depositary Authority National Collection of Industrial and Marine Bacteria Limited (NCIMB; Ferguson Building, Craibstone Estate, Bucksburn, Aberdeen AB219YA, UK) on 28 Nov. 2011 and accorded the accession number NCIMB 41903, or variants thereof.

In one aspect, the metabolic disease is selected from metabolic syndrome, obesity, diabetes, hypercholesteremia and hypertriglyceridemia.

In one aspect, the metabolic disease is diabetes. Preferably, the diabetes is selected from diabetes mellitus, type 1 diabetes, type 2 diabetes, prediabetes and insipidus diabetes.

In one aspect, there is provided a composition as described above for use in improving insulin sensitivity in a subject with diabetes.

In one aspect, the metabolic disease is metabolic syndrome. In one aspect, the metabolic disease is obesity.

In one aspect, the symptoms are selected from high cholesterol levels, high blood pressure, high blood sugar, excess body fat around the waist, high triglycerides, and insulin resistance symptoms related to metabolic syndrome.

In one aspect, there is provided a composition for use in a method of weight management or treating symptoms relating to weight gain, the composition comprising an isolated bacteria Lactobacillus brevis (DPC6108) deposited with the National Collection of Industrial and Marine Bacteria Limited (NCIMB) on 28 Nov. 2011 and accorded the accession number NCIMB 41903 or variants thereof.

In one aspect, the symptoms relating to weight gain include obesity, high blood pressure, high cholesterol levels, high triglycerides high blood sugar, diabetes.

In one aspect, the isolated bacteria, or a functional derivative thereof, is in the form of live cells, dead cells, cellular components, cell extracts, or cell lysates. Preferably, the dead cells, cellular components, cell extracts, or cell lysates are in powdered form.

In one aspect, there is provided a composition comprising an isolated bacteria Lactobacillus brevis (DPC6108) deposited with the National Collection of Industrial and Marine Bacteria Limited (NCIMB) on 28 Nov. 2011 and accorded the accession number NCIMB 41903 or variants thereof for use promoting diversity of the gut microbiota or for treating conditions or cohorts associated with low diversity of the gut microbiota.

In one aspect, the conditions or cohorts associated with decreased diversity of the gut microbiota include the elderly, post-antibiotic treatment, C-section delivered infants, Crohn's disease, etc.

In one aspect, the isolated bacteria is characterised by a 16s rRNA sequence of SEQUENCE ID NO: 1.

In one aspect, the composition is in the form of a product formulated for human ingestion. Preferably, the composition is in the form of a food product, a drink, a food supplement, or a medicament. In one aspect, the food supplement is in the form of an encapsulated powdered probiotic.

In one aspect, the composition further comprises a source of glutamate. Preferably, the source of glutamate is a glutamate salt.

In one aspect, the composition is administered daily to a subject in need thereof at a concentration of $1 \times 10^{10}$ CFU/ml/day.

In one aspect, the composition described is suitable for use as a medicament.

In one aspect, the composition is administered to an individual orally and forms part of the individual's microbiota.

In one aspect, there is provided a method of regulation or treatment of metabolic syndrome, metabolic disease, weight management, weight gain, obesity, diabetes, high triglycerides.

In one aspect, there is provided a method of treating diabetes, the method comprising administering to a subject suffering from diabetes a composition comprising an isolated bacteria Lactobacillus brevis (DPC6108) deposited with the National Collection of Industrial and Marine Bacteria Limited (NCIMB) on 28 Nov. 2011 and accorded the accession number NCIMB 41903 or a variant thereof, wherein the subject is administered $1 \times 10^{10}$ CFU/ml/day of the isolated bacteria.

In one aspect, there is provided a composition for use in a method of regulation or treatment of metabolic disease or symptoms thereof, the composition comprising an isolated bacteria Lactobacillus brevis (DPC6108) deposited with the National Collection of Industrial and Marine Bacteria Limited (NCIMB) on 28 Nov. 2011 and accorded the accession number NCIMB 41903, or a functional derivative thereof, the bacteria or functional derivative thereof being characterised in that is it culturable, is derived from a human neonatal gastrointestinal tract, and is capable of 100% conversion of monosodium glutamate (MSG) to γ-aminobutyric acid (GABA) in an in-vitro conversion test.

According to an aspect of the present invention, there is provided an isolated Lactobacillus brevis (DPC6108) deposited with the National Collection of Industrial and Marine Bacteria Limited (NCIMB) on 28 Nov. 2011 and accorded the accession number NCIMB 41903 (hereafter "DPC6108 strain" or "strain of the invention" or "deposited strain").

The invention also relates to a supernatant or cell material derived from the isolated DPC6108 strain.

The invention also provides a composition comprising the isolated DPC6108 strain, or a supernatant or cell material derived from the isolated DPC6108 strain.

The composition may be a pharmaceutical composition and may include a suitable pharmaceutical excipient. The composition may be provided in a unit dose form suitable for oral administration, i.e. a tablet or capsule.

The composition may be a food or beverage product, or a nutritional supplement.

The composition may comprise a probiotic material. The composition may comprise a prebiotic material.

The composition may comprise an additional probiotic bacterium.

The strain in the composition may be viable or non-viable and may comprise a strain extract (i.e. bacterial cell lysate) or supernatant derived from the strain. The extract or supernatant may be in any physical form, for example liquid or dried.

The composition may comprise at least $10^6$ cfu per gram of composition.

The composition may be solid or liquid. The composition may comprise a carrier for oral delivery. The carrier may be in the form of tablet, capsule, powder, granules, microparticles or nanoparticles. The carrier may be configured for targeted release in the intestine (i.e. configured for gastric transit and ileal release). The carrier may be configured for controlled release in the intestine (i.e. configured for gastric transit and ileal release).

The composition may be dried or lyophilised.

The invention also provides a method of producing a supernatant from an isolated Lactobacillus brevis (DPC6108) strain comprising a step of culturing the isolated strain and separating the supernatant from the strain.

The invention also provides a method of producing an extract from an isolated Lactobacillus brevis (DPC6108) strain comprising a step of lysing the cell and separating the cell extract from lysed cell material.

The invention also provides a supernatant or bacterial material or extract (for example a cell lysate) formed according to the method of the invention.

"Lactobacillus brevis (DPC6108) strain" refers to the strain of bacteria deposited with the National Collection of Industrial and Marine Bacteria (Ferguson Building, Craibstone Estate, Bucksburn, Aberdeen AB219YA, UK) under the Accession No. NCIMB 41903 on 28 Nov. 2011. The term is intended to include the strain in a viable or non-viable form, or mixtures of viable and non-viable bacteria. The strain may be provided in any format, for example as a liquid culture (or supernatant derived from a liquid culture), or cell material or extract derived from the strain or a culture of the strain, or in a dried or freeze-dried format. The invention may also employ growth media in which the strain of the invention was grown, or cell lysates generated using the strain of the invention. The term also includes mutants and variants of the deposited strain that are substantially identical, genetically and phenotypically, to the deposited strain and retain the activity of the deposited strain. Thus, the term includes derivatives of the strain that have been genetically engineered to modify the genome of the strain, typically without fundamentally altering the functionality of the organism, for example engineered for heterologous expression of a nucleic acid, or engineered to overexpress an endogenous gene, or engineered to silence a gene, to produce a recombinant or transformed strain of the invention. Genetic modifications may be carried out using recombinant DNA techniques and reagents, including gene editing technologies such as CRISP-Cas9 techniques. The term also includes variants of the strain having natural or spontaneous genetic alterations. The term is also intended to encompass variant strains obtained by serial passage of the isolated strain of the invention. The variant generally has a 16S rRNA amplicon (fragment) sequence that is identical or substantially identical with the deposited strain, for example at least 99.1%, 99.2%, 99.3%, 99.4%, 99.5%, 99.6%, 99.7%, 99.8% or 99.9% identical with the deposited strain. Sequence homology can be determined using an online homology algorithm "BLAST", publicly available on the World Wide Web at ncbi.nlm.nih.gov/BLAST/. The sequence of the 16s rRNA amplicon for the Deposited Strain is provided below (SEQUENCE ID NO: 1).

Dosage

It is preferable that the strain or composition is administered at least one per week over at treatment period of at least 4 weeks, and preferably at least 5, 6, 7, 8, 9, 10, 11, 12, 14, 16, 18- or 20-week period. Preferably, the strain or composition is administered several times a week, and ideally once a day. Compositions of the invention generally comprise between $10^3$ and $10^{12}$ cfu of the strain of the invention per gram of dry weight of the composition. In one embodiment, the composition comprises $10^3$ and $10^{12}$ cfu, or $10^4$ and $10^{12}$ cfu, or $10^6$ and $10^{10}$ cfu of the strain of the invention per gram of dry weight of the composition. A daily dose generally comprises between $10^3$ and $10^{12}$ cfu of the strain. In one embodiment, the daily dose comprises $10^3$ and $10^{12}$ cfu, or $10^4$ and $10^{12}$ cfu, or $10^6$ and $10^{10}$ cfu of the strain.

The effects that a daily dose of Lb. brevis DPC6108 ($1 \times 10^{10}$ CFU/mL/day) had on a subject are as follows:

significant reduction of adipose tissue deposits, specifically mesenteric adipose tissue and body fat mass.

increased resting serum insulin levels in healthy rats. During the glucose tolerance test, supplementation with Lb. brevis caused secretion of significantly more insulin in response to glucose load (plasma taken 15 min after glucose injection). This suggests an increase in the sensitivity of the endocrine response to promote glucose clearance.

significantly reduced cholesterol overall, compared with the HFC—associated with a reduction in fasting total cholesterol levels and an overall improvement in postprandial cholesterolemia.

higher gut microbial diversity compared to the HFC group.

reduced the duration of time spent immobile during the Forced Swim Test (improved high-fat diet induced behavioural deficits in depression-related behaviour)

significantly reduced basal corticosterone levels, compared with the HFC. Thus Lb. brevis administration can regulate high-fat diet induced increases in corticosterone, which has a significant effect on depression-related behaviour but which could also prove protective for HPA axis development in offspring of maternal obesity.

Definitions

In the specification, the term "metabolic syndrome" should be understood to mean a cluster of at least three of the following conditions that occur together: high blood pressure, high blood sugar, excess body fat around the waist (central obesity), and abnormal cholesterol or triglyceride levels (high serum triglycerides or low serum high-density lipoprotein (HDL)). Metabolic syndrome can lead to increasing one's risk of heart disease, stroke and diabetes.

The term "composition" as employed herein means a composition of matter including at least one bacterial culture as described above. Suitably, the composition is a product suitable for human or animal ingestion, for example a food product or drink, for example a dairy product including yoghurt or yoghurt drink, a dairy or non-dairy milk product, butter, cheese or cheese product, a soy product, a snack bar or other type of food product. The composition may also take the form of a health supplement, for example a powder for mixing with a liquid to make for example a shake, or a capsule or pill. The composition may also take the form of a pharmaceutical composition comprising a bacterial culture as described above and a suitable pharmaceutical carrier, the details of which will be well known to those skilled in the art. The pharmaceutical composition may take the form of a tablet, a capsule, a liquid or a suspension.

The term "treatment" as applied to a pathology generally should be understood to mean reducing or managing the symptoms of the pathology, curing the pathology, preventing the development of the pathology, or arresting the development of the pathology. In the case of mood disturbance, treatment should be understood to mean helping return the mood to a normal health mood, and also to prevent development of mood disturbance.

The term "for use as a medicament" as employed herein means that the composition is employed with a purpose of improving health, for example a food product that provides one or more health benefits or a pharmaceutical composition for a specific medical or veterinary indication, or a health supplement.

The composition, uses and methods of the invention are intended for use with mammals, but especially for use with humans and companion animals (for example dogs, cats and horses) and agricultural animals (for example bovine (cow, sheep, goat and porcine animals).

The bacterial cultures referred to above, or the derivatives thereof, may be in the form of live bacteria, dead bacteria or cellular components, or cell extracts or lysates thereof. Methods for preparing cellular components, cell extracts or cell lysates will be well known to those skilled in the art.

Sequences

Typically, the isolated *Lactobacillus brevis* (DPC6108) strain comprises a 16S rRNA sequence of SEQ ID NO: 1.

NATGACGTGCTTGCACTGATTTNAACAATGAAGCGAGTGGCGAACTGGTG

AGTAACACGTGGGAAATCTGCCCAGAAGCAGGGGATAACACTTGGAAACA

GGTGCTAATACCGTATAACAACAAAATCCGCATGGATTTTGTTTGAAAGG

TGGCTTCGGCTATCACTTCTGGATGATCCCGCGGCGTATTAGTTAGTTGG

TgAGGTAAAGGCCCACCAAGACGATGATACGTAGCCGACCTGAGAGGGTA

ATCGGCCACATTGGGACTGAGACACGGCCCAAAYTCCTACGGGAGGCAGC

AGTAGGGAATCTTCCACAATGGACGAAAGTCTGATGGAGCAATGCCGCGT

GAGTGAAGAAGGGTTTCGGCTCGTAAAACTCTGTTGTTAAAGAAGAACAC

CTTTGAGAGTAACTGTTCAAGGGTTGACGGTATTTAACCAGAAAGCCACG

GCTAACTACGTGCCAGCAGCCGCGGTAATACGTAGGTGGCAAGCGTTGTC

CGGATTTATTGGGCGTAAAGCGAGCGCAGGCGGTTTTTTAAGTCTGATGT

GAAAGCCTTCGGCTTAACCGGAGAAGTGCATCGGAAACTGGGAGACTTGA

GTGCAGAAGAGGACAGTGGAACTCCATGTGTAGCGGTGGAATGCGTAGAT

ATATGGAAGAACACCAGTGGCGAAGGCGGCTGTCTAGTCTGTAACTGACG

CTGAGGCTCGAAAGCATGGGTAGCGAACAGGATTAGATACCCTGGTAGTC

CATGCCGTAAACGATGAGTGCTAAGTGTTGGAGGGTTTCCGCCCTTCAGT

GCTGCAGCTAACGCATTAAGCACTCCGCCTGGGGAGTACGACCGCAAGGT

TGAAACTCAAAGGAATTGACGGGGGCCCGCACAAGCGGTGGAGCATGTGG

TTTAATTCGAAGCTACGCGAAGAACCTTACCAGGTCTTGACATCTTCTGC

CAATCTTAGAGATAAGACGTTCCCTTCGGGGACAGAATGACAGGTGGTGC

ATGGTTGTCGTCAGCTCGTGTCGTGAGATGTTGGGTTAAGTCCCGCAACG

AGCGCAACCCTTATTATCAGTTGCCAGCATTCAGTTGGGCACTCTGGTGA

GACTGCCGGTGACAAACCGGARGAAGGTGGGGATGACGTCAAATCATCAT

GCCCCTTATGACCTGGGCTACCACCGTGCTACAATGGACGGTACAACGAG

TCGCGAAGTCGTGAGGCTAAGCTAATCTCTTAAAGCCGTTCTCAGTTCGG

ATTGTAGGCTGCAACTCGCCTACATGAAGTTGGAATCGCTAGTAATCGCG

GATCAGCATGCCGCGGTGAATACGTTCCCGGGCCTTGTACACACCGCCCG

TCACACCATGAGAGTTtGTAACACCCAAAGCCGGTGAGANACCTCG

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Materials and Methods

Animals and Treatment

Figure 1:
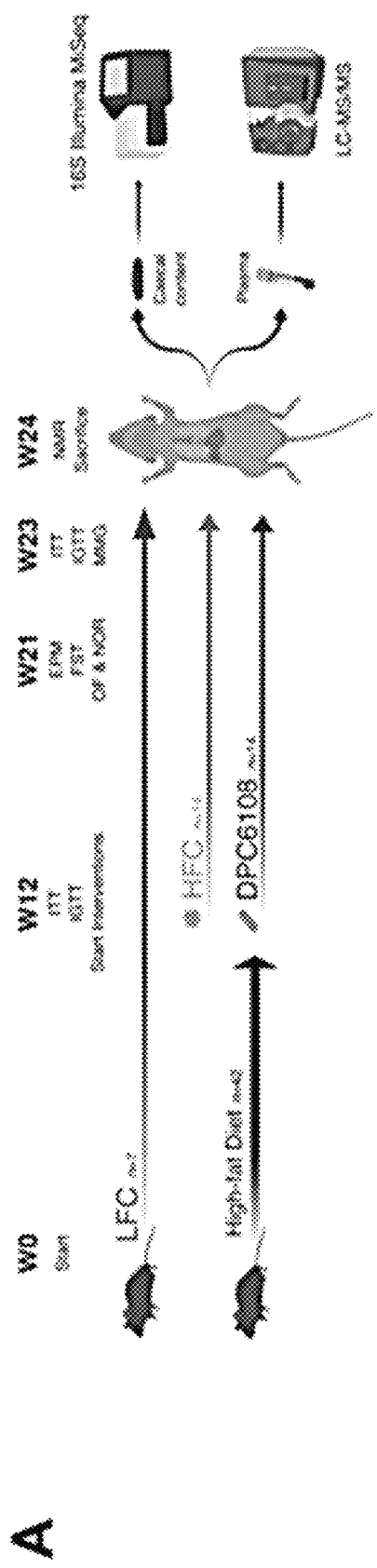
FIG. 1A-E illustrates *Lb. brevis* reduces fat mass and distribution of mesenteric adiposity after 12 weeks of treatment. (A) Schematic figure representing mouse trial design and timeline for procedures, with high-fat diet represented by the solid red arrow (HFC) and microbial treatment in a 12-week intervention represented by a green arrow (DPC6108). (B) Body weight gain throughout the pre-feeding (white background (LHS)) and intervention (red background (RHS)) for n=14 mice per group. (C) Adipose tissue mass and distribution across EAT, SAT and MAT and (D) Fat and lean body composition. (E) Final body weight after 24-week feeding (HFC; n=13 and LFC; n=10) and 12-week intervention with DPC6108 (n=14). Data are expressed as mean±SEM. Bodyweight data were analysed using the mixed model ANOVA. Tukey's post-hoc test was applied. All other data were analysed using the appropriate unpaired student t-test (HFC vs LFC) and one-way analysis of variance (ANOVA). ###$p<0.001$ HFC vs LFC, *$p<0.05$ treatment vs HFC and **$p<0.01$ treatment vs HFC. IGTT: intraperitoneal glucose tolerance test, ITT: insulin tolerance test, EPM: elevated plus maze, FST: forced swim test, OF: open field, NOR: novel object recognition, MMG: mixed meal gavage, NMR: nuclear magnetic resonance, HFC: high fat control, DPC6108: *Lb. brevis* DPC6108, LFC: low fat control, EAT: epididymal adipose tissue, SAT: subcutaneous adipose tissue and MAT: mesenteric adipose tissue.
Figure 1:
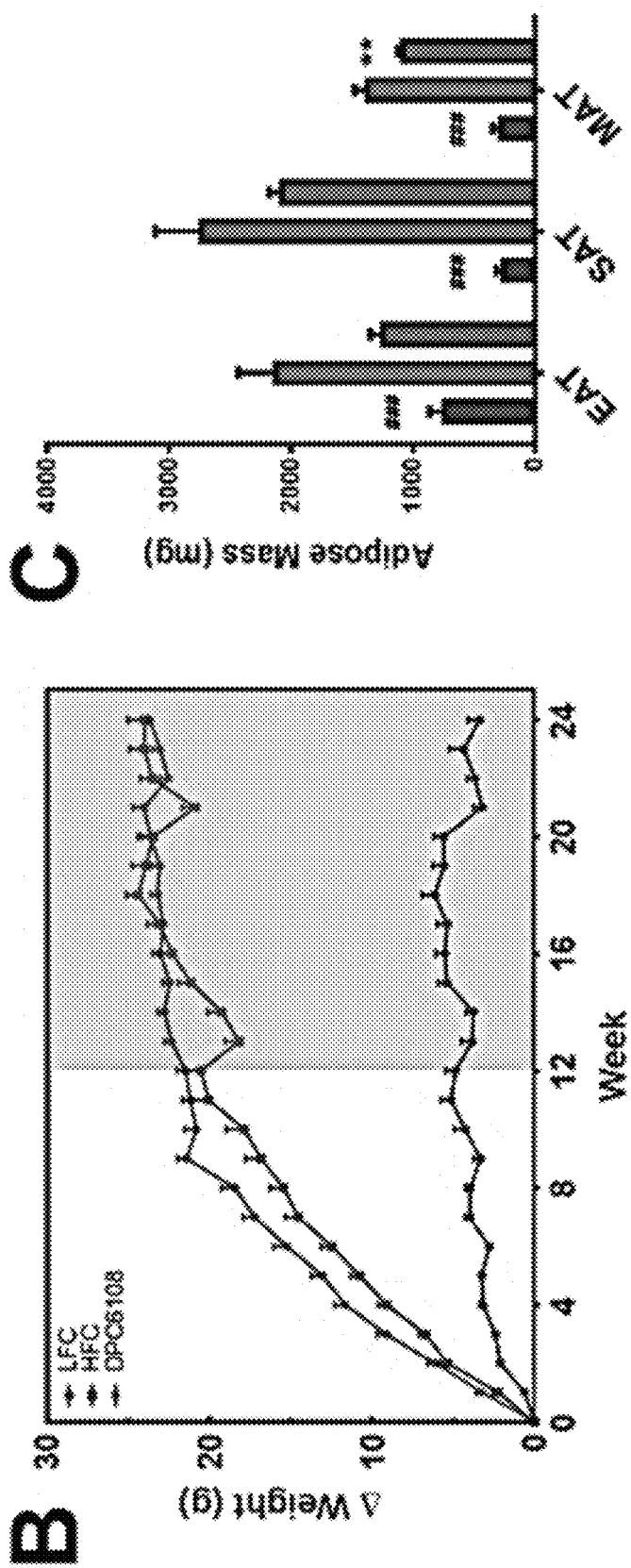
Figure 1:
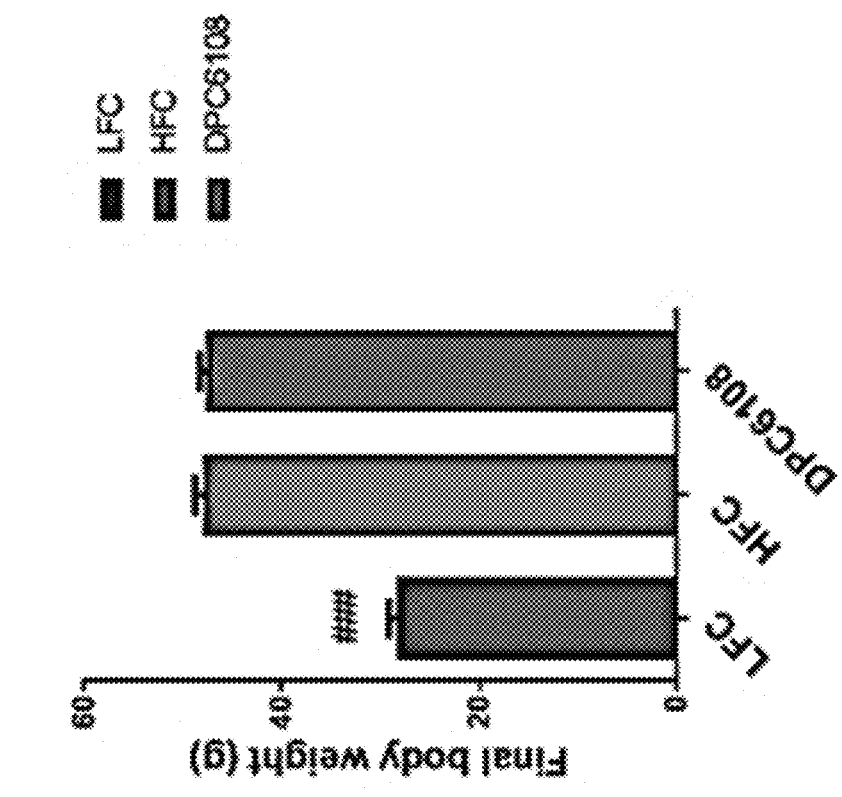
Figure 1:
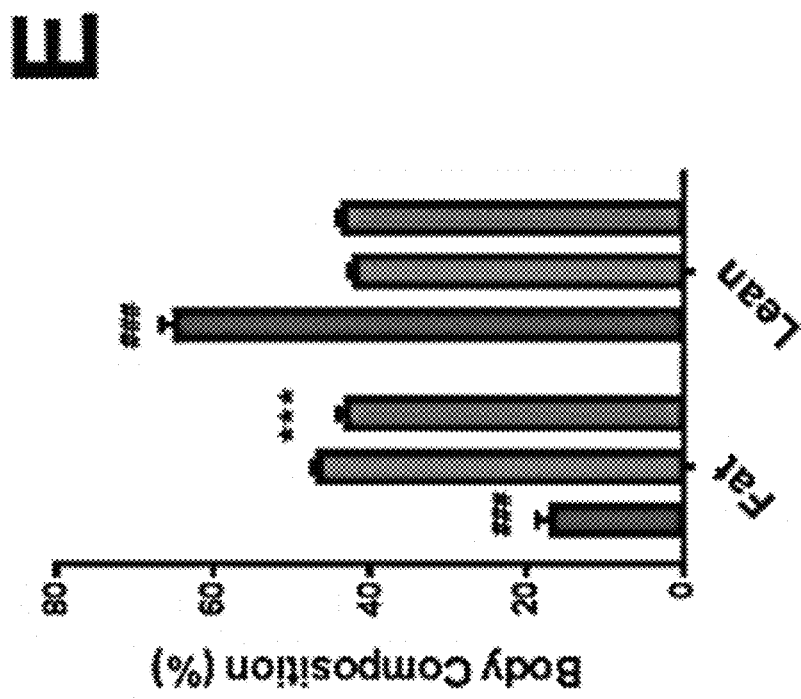

All experimental procedures were performed in accordance with the protocols approved by the University College Cork (UCC) Ethics Committee, under a license issued from the Health Products Regulatory Authority. Male C57BL/6J mice, three weeks of age, were obtained from Envigo (Blackthorn, UK) and housed under barrier-maintained conditions at the Biological Services Unit, UCC. All mice were left to acclimatise to their environment for five weeks prior to administration of diets. Mice were randomly divided into four groups (n 14 per group), housed in groups of three to four mice per cage at standard conditions (room temperature of 21° C., with a 12-h light-dark cycle, lights on at 07:00). The groups were assigned as follows; a low fat (LF) group fed ad libitum with Open Source Diets (D15072701-10% kcal from fat and equal parts corn starch and sucrose; (Research Diets Inc., NJ 08901 USA)) and three high fat (HF) groups fed ad libitum with Open Source Diets (D12492-60% kcal from fat; Research Diets Inc.) and were allowed free access to food and water, for 12 weeks. The compositions of the diets are outlined in Table 1.

TABLE 1

Mice were fed ad libitum with either a low fat diet (Open Source Diets (D15072701 - 10% kcal from fat and equal parts corn starch and sucrose; (Research Diets Inc., NJ 08901 USA)) or a high fat diet (Open Source Diets (D12492 - 60% kcal from fat; Research Diets Inc.)) and were allowed free access to food and water, for 12 weeks.

| | Product # | | | |
|---|---|---|---|---|
| | D15072701 | | D12492 | |
| | gm | kcal | gm | kcal |
| % | | | | |
| Protein | 19 | | 20 | |
| Carbohydrate | 67 | | 26 | |
| Fat | 4 | | 35 | |
| | | | | |
| Total | | 100 | | 100 |
| kcal/gm | 3.8 | | 5.2 | |
| Ingredient | | | | |
| Casein | 200 | 800 | 200 | 800 |
| L-Cysteine | 3 | 12 | 3 | 12 |
| Corn Starch | 280 | 1120 | 0 | 0 |
| Maltodextrin 10 | 140 | 560 | 125 | 500 |
| Sucrose | 280 | 1120 | 68.8 | 275 |
| Cellulose, BW200 | 50 | 0 | 50 | 0 |
| Soybean Oil | 25 | 225 | 25 | 225 |
| Lard | 20 | 180 | 245 | 2205 |
| Mineral Mix S10026 | 10 | 0 | 10 | 0 |
| DiCalcium Phosphate | 13 | 0 | 13 | 0 |
| Calcium Carbonate | 5.5 | 0 | 5.5 | 0 |
| Potassium Citrate, 1 H2O | 16.5 | 0 | 16.5 | 0 |
| Vitamin Mix V10001 | 10 | 40 | 10 | 40 |
| Choline Bitartrate | 2 | 0 | 2 | 0 |
| FD&C Yellow Dye #5 | 0 | 0 | 0 | 0 |
| FD&C Red Dye #40 | 0.025 | 0 | 0 | 0 |
| FD&C Blue Dye #1 | 0.025 | 0 | 0.05 | 0 |
| Total | 1055.05 | 4057 | 773.85 | 4057 |

<p style="text-align:center">Fat (7 should carbohydrate: HF: 35</p>

After 12 weeks of either LF or HF feeding, two control groups were maintained on either the LF diet (LFC; n 14) or HF diet (HFC; n 14) for a further 12 weeks and the remaining two HF dietary groups were subdivided into intervention groups for a further 12 weeks. The HF intervention group was HF+*Lb. brevis* DPC6108 ($1 \times 10^{10}$ CFU/day; DPC6108). All interventions were administered daily in drinking water. Water containing *Lb. brevis* DPC6108 was the only water supplied to the mice in the group for the 12/week intervention period and bottles were replaced daily. Bodyweight and food intake were measured weekly for all groups. Following 12 weeks of intervention, mice were fasted overnight and body mass was measured using a Minispec mq benchtop NMR spectrometer (Bruker Instruments, Germany). The mice were subsequently sacrificed by cervical dislocation. All dissected tissue samples were flash frozen immediately in liquid nitrogen. Individual blood samples were collected in plasma collection tubes (BD Diagnostics, Oxford, UK) and allowed to clot for at least 30 min at 4° C. before centrifugation for 20 min at 10,000 g to isolate the plasma.

Preparation and Administration of Lb. Brevis DPC6108

Lb. brevis DPC6108 is an efficient GABA producer, with maximum conversion in vitro when grown on MRS broth supplemented with 3% (w/v) monosodium glutamate (MSG) (BARRETT, E., ROSS, R. P., O'TOOLE, P. W., FITZGERALD, G. F. & STANTON, C. 2012. gamma-Aminobutyric acid production by culturable bacteria from the human intestine. *J Appl Microbiol*, 113, 411-7). Rifampicin-resistant variants of Lb. brevis DPC6108 were isolated by spread-plating ~$10^9$ CFU from an overnight culture (1% inoculum) onto MRS agar (Difco Laboratories) containing 500 µg rifampicin/mL (Sigma-Aldrich Ireland Ltd. Arklow, Ireland) and stocked at −80° C. Before freeze-drying, frozen stocks were plated on MRS agar and single colonies were isolated for inoculation in 10 mL fresh MRS broth supplemented with 30 mg/mL MSG. The cultures were incubated overnight at 37° C. under anaerobic conditions and then inoculated into 1 L MRS broth containing 3% (w/v) MSG and allowed to grow overnight at 37° C., under anaerobic conditions. The overnight culture aliquots were then inoculated into large volumes of MRS containing MSG and allowed to grow overnight at 37° C. under anaerobic conditions. The overnight cultures were washed twice in phosphate buffered saline (Sigma-Aldrich Ireland Ltd.) and the pellets re-suspended in 15% (w/v) trehalose (Sigma-Aldrich Ireland Ltd.) in $dH_2O$. One-millilitre aliquots of bacterial cultures were freeze-dried by using a 24-h program (freeze temperature, −40° C.; condenser set point, −60° C.; vacuum set point, 600 mTorr). All the vials containing freeze-dried powder were stored at 4° C. until use. Each animal that received the bacterial strain consumed ~$1 \times 10^{10}$ live microorganisms/day. This was achieved by resuspension of freeze-dried powder (containing $2 \times 10^{11}$ CFU/g) in 100 mL of sterile water, which mice consumed ad libitum. Freeze-dried aliquots were prepared every two weeks, continuously underwent quality control checks and were stored at 4° C. until use.

Culture Dependent Microbial Analysis

To confirm that Lb. brevis DPC6108 tolerated freeze-drying conditions, the strains were plated on MRS agar supplemented with rifampicin before and after freeze-drying. Fresh faecal samples were taken for microbial analysis to verify strain survival following gastric transit. Microbial analysis involved enumeration of the Lb. brevis DPC6108 strain after plating serial dilutions on MRS agar supplemented with 100 µg rifampicin/mL (Sigma-Aldrich Ireland Ltd.) and incubating anaerobically for 48 hr at 37° C. In addition, isolated colonies were tested for GABA production in vitro, as described previously (Barrett et al., 2012). Briefly, isolated colonies were grown anaerobically in MRS containing 3% (w/v) and 1% (w/v) MSG at 37° C. for 55 hr. Samples were then deproteinized by mixing equal volumes of 24% (w/v) trichloroacetic acid (TCA) and culture, allowed to stand for 10 min and centrifuged at 14,000 g for 10 min. Supernatants were removed and diluted with 0.2 mol/L sodium citrate buffer, pH 2.2 to yield 250 nmol of each amino acid residue. Samples were then diluted with the internal standard, norleucine, to yield a final concentration of 125 nm/mL. Amino acids were quantified using a Jeol JLC-500/V amino acid analyser (Jeol Ltd, Garden City, Herts, UK) fitted with a Jeol $Na^+$ high-performance cation exchange column.

Glucose and Insulin Tolerance Tests

After 12 weeks of feeding, an intraperitoneal-glucose tolerance test (IP-GTT) and an intraperitoneal-insulin tolerance test (IP-ITT) was performed in the LFC (n 7) and HFC (n 7) groups. After 10 weeks of intervention, the IP-GTT and IP-ITT were performed on individual mice in the LFC, HFC, and DPC6108 groups. For the IP-GTT, mice were injected with a glucose load (1 g/Kg bodyweight) directly into the peritoneal cavity, following a 6 hr fast. Blood glucose levels were measured before and 15, 30, 60, 90 and 120 min after glucose load. For the IP-ITT, mice were injected with an insulin load (0.75 IU/g bodyweight) directly into the peritoneal cavity, following a 6 hr fast. Blood glucose levels were measured before and 15, 30, 60, 90 and 120 min after insulin load. The concentration of blood glucose during the IP-GTT and IP-ITT was determined using a glucose meter (Accu-Chek Aviva, Roche Diabetes Care Ltd., West Sussex, UK) on blood samples collected from the tip of the tail vein.

Insulin Resistance Index

The plasma insulin concentrations were measured in plasma collected from tail blood during the IP-GTT, after 10 weeks of intervention, using a Mouse Insulin ELISA kit (Mercodia, Uppsala, Sweden), according to the manufacturer's instructions. The insulin resistance index was determined by multiplying the area under the curve of both the blood glucose (0 to 120 min) and the plasma insulin (0 to 15 min) obtained from the IP-GTT.

Mixed-Meal Tolerance Test

A mixed-meal tolerance test was performed after 10 weeks of intervention. Mice were fasted for 6 hr and a baseline blood sample was taken from the tail following tail incision and collected into EDTA tubes (BD Diagnostics). Mice were then administered 200 µl of Ensure Plus liquid diet (1.5 kcal/mL, 29.5% fat; Abbott Nutrition, Dublin, Ireland) by intragastric gavage. Blood was collected 2, 4 and 18 hr post-gavage. The blood was left to clot for at least 30 min at 4° C. before centrifugation for 20 min at 10,000 g to isolate the plasma. The plasma was then analysed for cholesterol concentration at all time points (EnzyChrom colorimetric assay; Cambridge Biosciences, UK).

Plasma Analyses

Trunk plasma was analysed by ELISA for levels of insulin (Mercodia Mouse Insulin ELISA; Cat No. 10-1247-01; Uppsala, Sweden), leptin (Crystal Chem Inc.; Cat. No. 90030; IL 60515, USA), C-peptide (Crystal Chem Inc.; Cat. No. 90050), adiponectin (Crystal Chem Inc.; Cat. No. 80569), glucagon (Mercodia Glucagon ELISA—10 µl; Cat No. 10-1281-01; Uppsala, Sweden) and cytokines (Meso Scale Discovery, V-PLEX Plus Proinflammatory Panel 1; Cat. No. N05048A-1; Rockville, Maryland, USA). Trunk plasma was analysed by enzymatic assay for glucose (Crystal Chem Inc.; Cat. No. 81692) and haemoglobin A1c (Crystal Chem Inc.; Cat. No. 80310) according to the protocols described by the manufacturers.

GABA Assay

Frozen samples of epididymal adipose tissue and small intestinal content were diluted (10%, (w/v)) in tissue lysis solution (0.01 N HCl, 1 mM EDTA, 4 mM sodium metabisulphite (Sigma-Aldrich Ireland Ltd)) and homogenised. A commercially available enzyme immunoassay was then used for the quantitative determination of GABA by ELISA (ImmuSmol, Pessac, France). Quantification of unknown samples was achieved by comparing their absorbance with a standard curve prepared with known standards.

Spleen Cytokine Analysis

Spleens were collected immediately following sacrifice and cultured. To culture spleen cells, first the spleens where homogenised in media [RPMI (with L-glutamine and sodium bicarbonate, Sigma-Aldrich Ireland Ltd.)+FBS (Sigma-Aldrich Ireland Ltd)+Pen/Strep]. The homogenate was then filtered over a 70 μm strainer, centrifuged at 200 g for 5 min and resuspended in media. Cells were counted and seeded (4,000,000/mL media). After 2.5 hr of adaptation, cells were stimulated with LPS (2 μg/ml) for 24 hr. Following stimulation, the supernatants were harvested to assess cytokine release using Proinflammatory Panel 1 (mouse) V-PLEX Kit (Meso Scale Discovery, Maryland, USA) for TNFα, IL-10 and IL-6. The analyses were performed using MESO QuickPlex SQ 120, SECTOR Imager 2400, SECTOR Imager 6000, SECTOR S 600.

Plasma Metabolome—Direct Flow Injection and LC-MS/MS

Plasma was isolated from whole blood, as previously described and analysed using the Biocrates AbsoluteIDQ p180 Kit (BIOCRATES Life Sciences AG, Austria), using methods previously described (WALSH, B. H., BROADHURST, D. I., MANDAL, R., WISHART, D. S., BOYLAN, G. B., KENNY, L. C. & MURRAY, D. M. 2012. The Metabolomic Profile of Umbilical Cord Blood in Neonatal Hypoxic Ischaemic Encephalopathy. *Plos One*, 7). Following extraction and derivatisation, all analytes present in the samples were detected and quantified on an ABI 4000 Q-Trap mass spectrometer (MDS Sciex) run in conjunction with a reverse-phase HPLC-column. The analysis revealed levels of a range of specific amino acids, biogenic amines (BA), acylcarnitines (AC), lysophosphotidylcholines (lysoPC), phosphotidylcholines (PC), sphingomyelins (SM) and hexoses.

Microbial DNA Extraction, 16S rRNA Amplification and Illumina Miseq Sequencing

Cecal contents were collected from individual mice following 12 weeks of dietary intervention. Total metagenomic DNA was extracted from cecal contents with the Qlamp® PowerFecal® DNA Kit (Qiagen, Milano, Italy) where an additional bead beating step was incorporated into the protocol. Extracted DNA was quantified using the NanoDrop™ 8000 Spectrophotometer (Thermo Fisher Scientific). Total genomic DNA was then subjected to PCR amplification by targeting a 464-bp fragment of the 16S rRNA variable region V3-V4 (BAKER, G. C., SMITH, J. J. & COWAN, D. A. 2003. Review and re-analysis of domain-specific 16S primers. *J Microbiol Methods*, 55, 541-55; CLAESSON, M. J., WANG, Q., O'SULLIVAN, O., GREENE-DINIZ, R., COLE, J. R., ROSS, R. P. & O'TOOLE, P. W. 2010. Comparison of two next-generation sequencing technologies for resolving highly complex microbiota composition using tandem variable 16S rRNA gene regions. *Nucleic Acids Res*, 38, e200) using the specific bacterial primer set 341F (5'-CCTACGGGNGGCWGCAG-3'-SEQ ID NO. 2 and 806R (5'-GACTACNVGGGTWTCTAATCC-3'-SEQ ID NO. 3) with overhang Illumina adapters. Unique barcodes were attached to the forward primer for facilitating the differentiation of samples. Amplicons were cleaned with the Agencourt AMPure kit (Beckman coulter) following the manufacturer's instructions, and DNA was quantified using the Quant-iT PicoGreen dsDNA kit (Invitrogen). Amplicons were mixed and combined in equimolar ratios, and the quality and purity of the library was checked with the High Sensitivity DNA Kit (Agilent, Palo Alto, CA, USA) by the Bioanalyzer 2100 (Agilent). The library was sequenced on an Illumina MiSeq platform at CIBIO (Center of Integrative Biology)—University of Trento, Italy.

Bioinformatic Analysis by QIIME

Sequences obtained from Illumina sequencing were processed using Quantitative Insights Into Microbial Ecology (QIIME) software package version 1.9. The paired-end reads were associated to the corresponding sample through the unique barcode and joined. Reads were further processed with the inclusion of quality filtering based on a quality score of >20 followed by subsequent removal of sequences below length threshold. Uclast was then used for clustering the reads left into operational taxonomic units (OTUs) at 97% identity. PyNAST (CAPORASO, J. G., BITTINGER, K., BUSHMAN, F. D., DESANTIS, T. Z., ANDERSEN, G. L. & KNIGHT, R. 2010a. PyNAST: a flexible tool for aligning sequences to a template alignment. *Bioinformatics*, 26, 266-7) was used to align OTUs with a minimum alignment of 150 bp and 80% of minimum identity, and taxonomy was assigned by using Ribosomal Database Project (RDP) classifier 2.0.1. QIIME was used to generate alpha (Chao1, observed OTUs) and beta diversities (Bray Curtis) distance matrices, and principal coordinate analysis (PCoA) plots were generated based on the beta diversity distance matrices. The data generated by Illumina sequencing were deposited in the NCBI Sequence Read Archive (SRA) and are available under Ac. No. PRJNA414526.

Behaviour Test Battery

Following 20 weeks of high fat feeding and 8 weeks of *Lb. brevis* intervention, mice underwent a behavioural test battery. For all behavioural tests, mice were habituated to the testing room by placing home-cages in the test room for at least 30 min prior to testing. The same mice were assessed across all behavioural tests. The behaviour tests were completed over two weeks. All apparatus were cleaned with 70% (v/v) ethanol between mice in each test. A researcher remained in the testing room during each behavioural measure. All outputs were measured by an experimenter blinded to the experimental groups.

Forced Swim Test

Following nine weeks of dietary intervention, depressive-like behaviour and stress responsiveness were assessed using the forced swim test (FST), as previously described (CRYAN, J. F., DALVI, A., JIN, S. H., HIRSCH, B. R., LUCKI, I. & THOMAS, S. A. 2001. Use of dopamine-beta-hydroxylase-deficient mice to determine the role of norepinephrine in the mechanism of action of antidepressant drugs. *J Pharmacol Exp Ther*, 298, 651-7). Mice were individually placed in a transparent plexi-glass cylinder (24 cm×21 cm, H×D), containing 15 cm-depth water maintained at room temperature (22±1° C.) for a single six min trial. Water was renewed between each trial. The total time of immobility was scored in the last four min. Immobility was defined as the total absence of movement, except slight motions to maintain the head above water. After the trial, mice were gently dried and single-housed for two hours of recovery, before being placed back to their home cages with littermates.

Stress-Induced Corticosterone Production

To assess stress-responsiveness, blood samples were taken in response to an acute stress (FST). First, a blood sample was collected from the tail following tail incision, five min before the test. After the acute stress, mice were singly housed following removal from the FST, and blood samples were collected.

Bleeding was performed in a separate room to the FST. Blood samples (50-70 µl) were taken from the tail and collected in heparin coated capillary tubes. Isolated blood was left to clot for at least 30 min at 4° C. before centrifugation for 15 min at 10,000 g to isolate the plasma. Isolated plasma was stored at −80° C. for later corticosterone quantification. Corticosterone was quantified using a commercially available ELISA kit (Enzo Life Sciences (UK) Ltd., Exeter, UK) according to the manufacturer's protocol.

Statistical Analyses

All data are expressed as mean±SEM. Data were analysed using the appropriate unpaired student t-test and one-way analysis of variance (ANOVA). Bodyweight data were analysed using the mixed model ANOVA. Tukey's post-hoc test was applied. Data were deemed significant when p<0.05. Levenes test for homogeneity of variances was used and where homogeneity wasn't found, Welch's robust test of equality of means was applied. Mauchly's test of sphericity was used and if values were significant, then Greenhouse Geisser was applied. All student t-tests, one-way ANOVA, and post hoc analyses were performed using PASW Statistics 22. Graphs were generated using Graphpad Prism 7. Metabolomic data was log normalised prior to ANOVA and multivariate analysis (sPLS-DA) was also performed on metabolomic data. For metabolomic data, a false discovery rate (FDR) q value less than 0.05 was considered statistically significant.

Results

*Lb. Brevis* Survived Transit Through the Mouse Gastrointestinal Tract

Quantification of the numbers of administered rifampicin-resistant *Lb. brevis* DPC6108 in the faeces of mice confirmed survival following gastrointestinal transit. Stool recovery of *Lb. brevis* DPC6108 was ~2×10$^9$ CFU/g faeces after 2-weeks on the trial and remained at similar numbers following four weeks of dietary intervention. Colonies isolated from the plates were tested for GABA production to assess if gastric transit affected ability of *Lb. brevis* DPC6108 to produce GABA in vitro. All colonies tested had a similar % conversion of MSG to GABA in vitro when compared to the wild type strain (average of 53% for DPC6108, compared to the wild type (66%)).

Intervention with GABA-Secreting *Lb. Brevis* Improved Adipose Deposition Associated with High Fat Feeding Following 12 weeks of HF feeding, there were no differences in body weight gain between the groups (FIG. 1B). There was a significant interaction between time and treatment with *Lb. brevis* strains ($F_{2,4.88}$=5.348, p<0.001; FIG. 1B). After 12 weeks intervention with *Lb. brevis* strain DPC6108, no differences in final bodyweight were observed between the groups consuming the HF diet ($F_{3,51}$=0.823, p=0.487; FIG. 1E). Intervention did however have a significant effect on adipose tissue deposits, specifically mesenteric adipose tissue (MAT) ($F_{2, 21.604}$=7.741, p=0.008; FIG. 1C). The microbial intervention, DPC6108 (p=0.002), was associated with reduced quantity of MAT, compared with the HFC (FIG. 1C). In line with this, there was a significant effect of intervention on percentage body fat mass ($F_{2,38}$=48.984, p=0.001). Body fat mass was reduced in DPC6108 (p<0.001) compared with the HFC (FIG. 1D).

Figure 2:
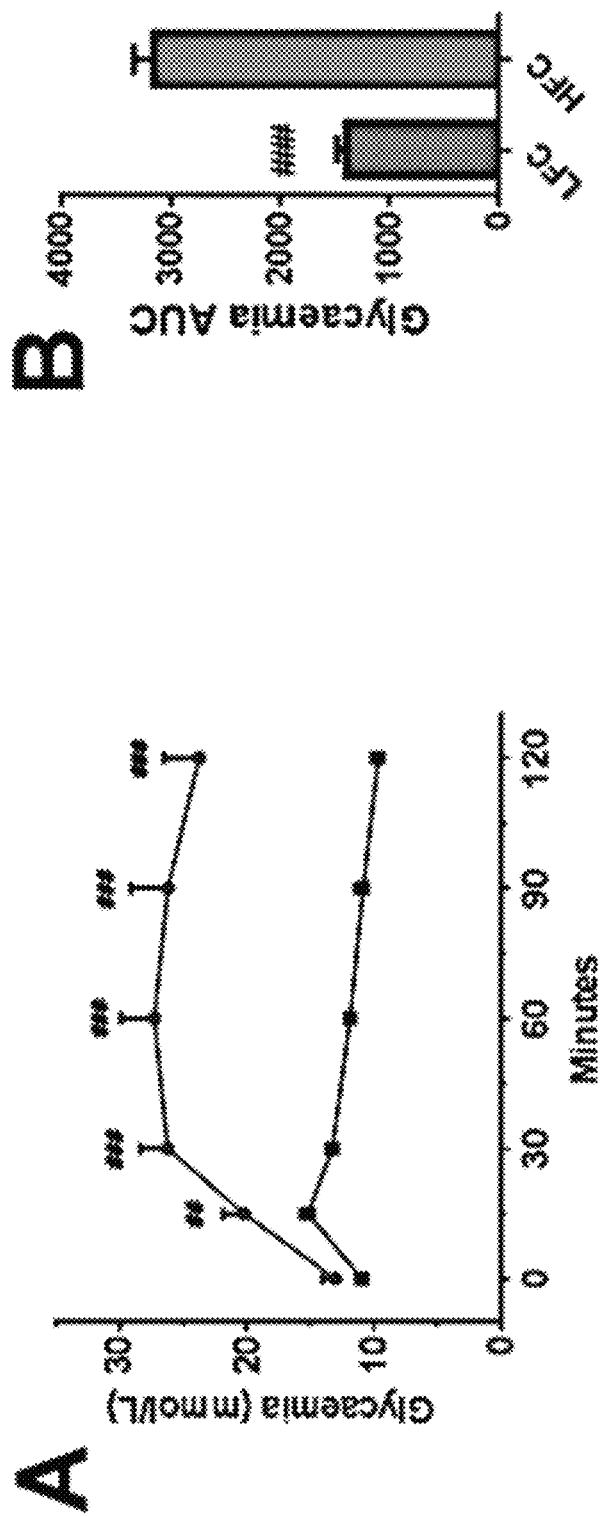
FIG. 2A-L illustrates glucose tolerance and insulin sensitivity. *L. brevis* improves glucose clearance and improves glucose-dependent insulin secretion following glucose challenge. HFC (n=7) and LFC (n=7) mice were assessed for 1 g/Kg glucose (IP-GTT; A and B) and 0.75 IU/Kg insulin (ITT; C and D) glycaemic responses at 12 weeks of feeding, prior to commencement of treatments. At week 22 of feeding/week 10 of intervention, LFC (n=7), HFC (n=7), DPC6108 (n=14 mice were again assessed for glycaemic responses to glucose (E and F) and insulin (G and H) challenges. Plasma insulin concentration as determined from samples collected at T=0 and T=15 during glucose challenge for LFC (n=7), HFC (n=5) and DPC6108 (n=14) (I) and insulin resistance index determined by multiplying the area under the curve of both the blood glucose (0 to 120 min) and the plasma insulin (0 to 15 min) obtained following glucose challenge (J). *Lb. brevis* improves cholesterol metabolism and increases GABA concentrations in the small intestinal content. At week 22 of feeding/week 10 of intervention LFC (n=7), HFC (n=7) and DPC6108 (n=14) mice were again assessed for lipid and cholesterol metabolism by oral gavage with a complete meal, Ensure Plus, Abbott Nutrition. Total plasma cholesterol was measured at T=0, T=2, T=4 and T18 hr post-gavage (K). Total AUC for cholesterol metabolism was calculated form individual time points for all groups (L). Data are expressed as mean±SEM. All data was analysed using the appropriate unpaired student t-test (HFC vs LFC) and one-way analysis of variance (ANOVA). #$p<0.001$ HFC vs LFC, ##$p<0.001$ HFC vs LFC and ###$p<0.001$ HFC vs LFC, *$p<0.05$ treatment vs HFC, $p<0.01$ treatment vs HFC and *$p<0.001$ treatment vs HFC. AUC: area under curve, HFC: high fat control, DPC6108: *Lb. brevis* DPC6108, LFC: low fat control.
Figure 2:
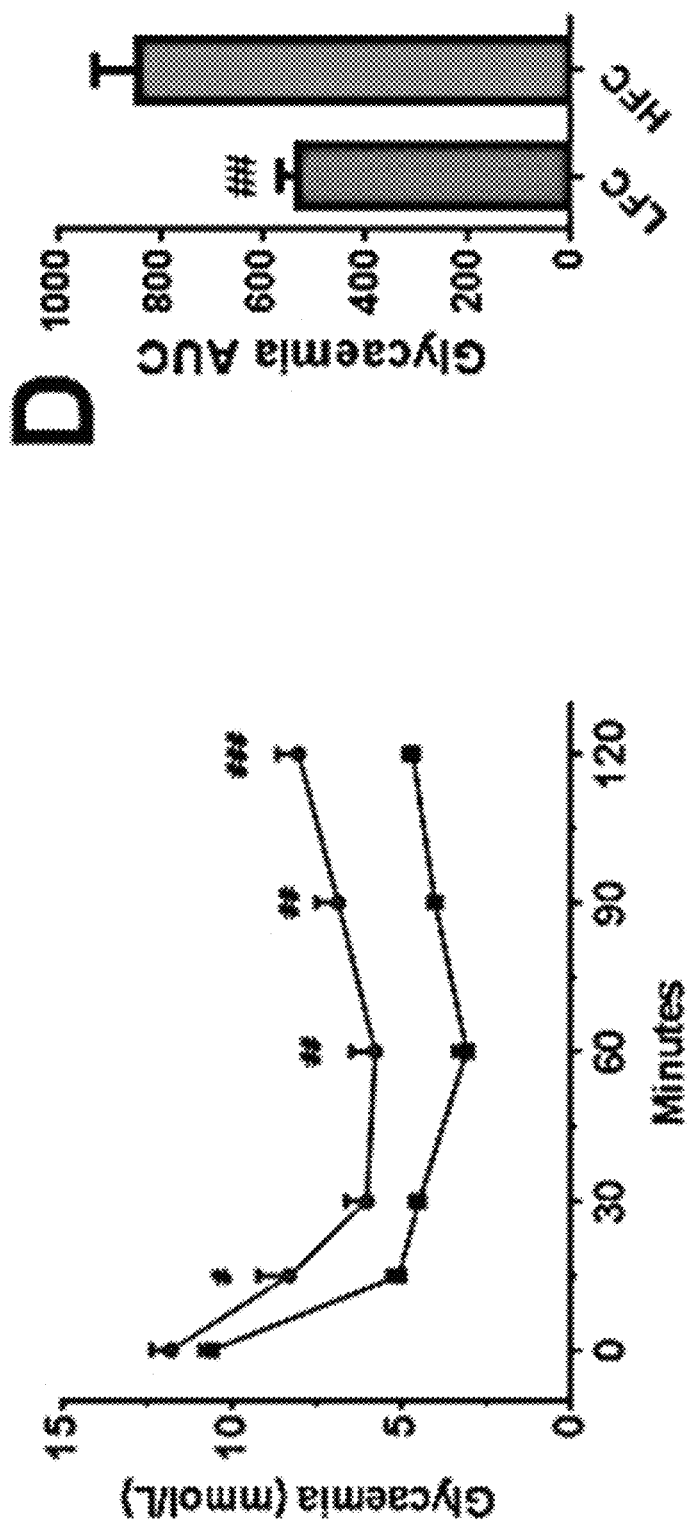
Figure 2:
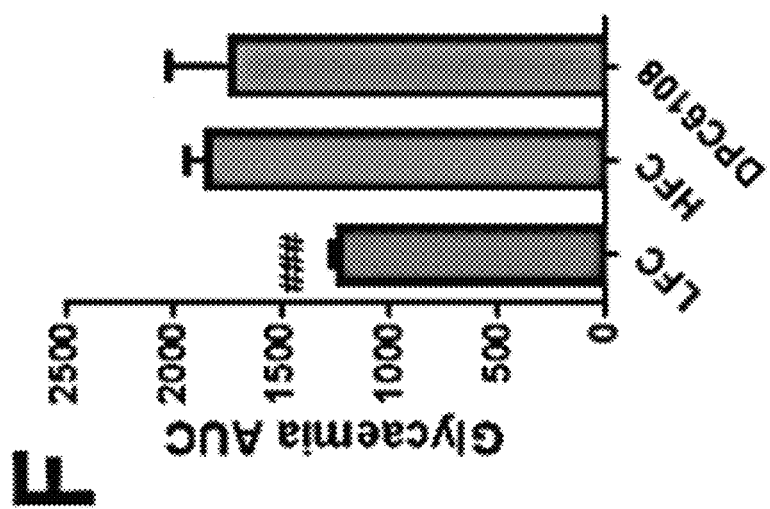
Figure 2:
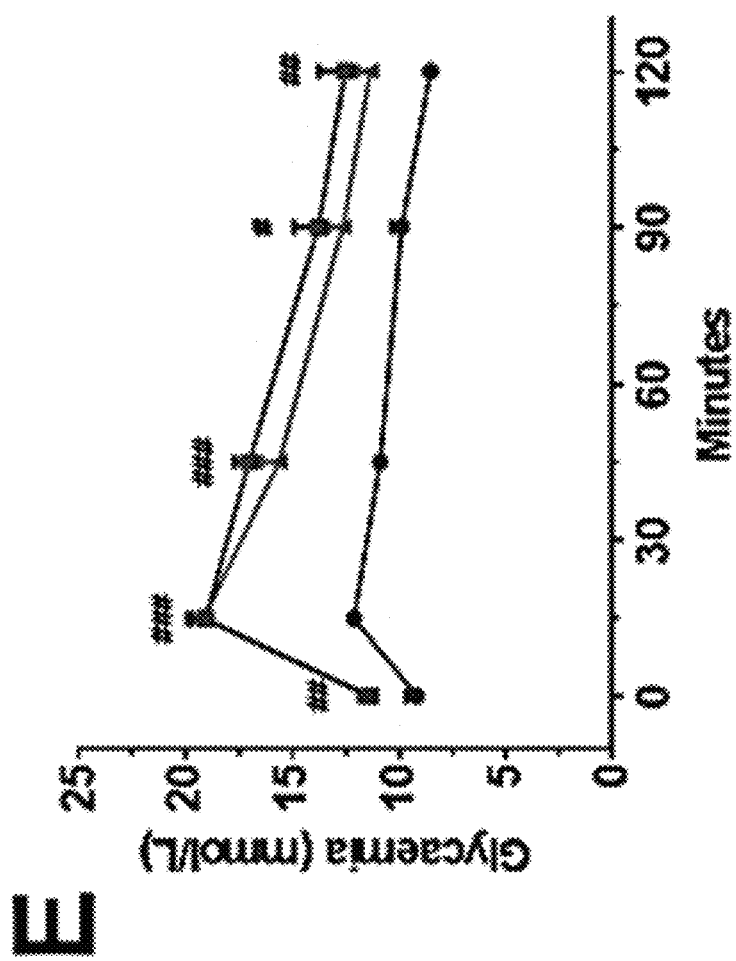
Figure 2:
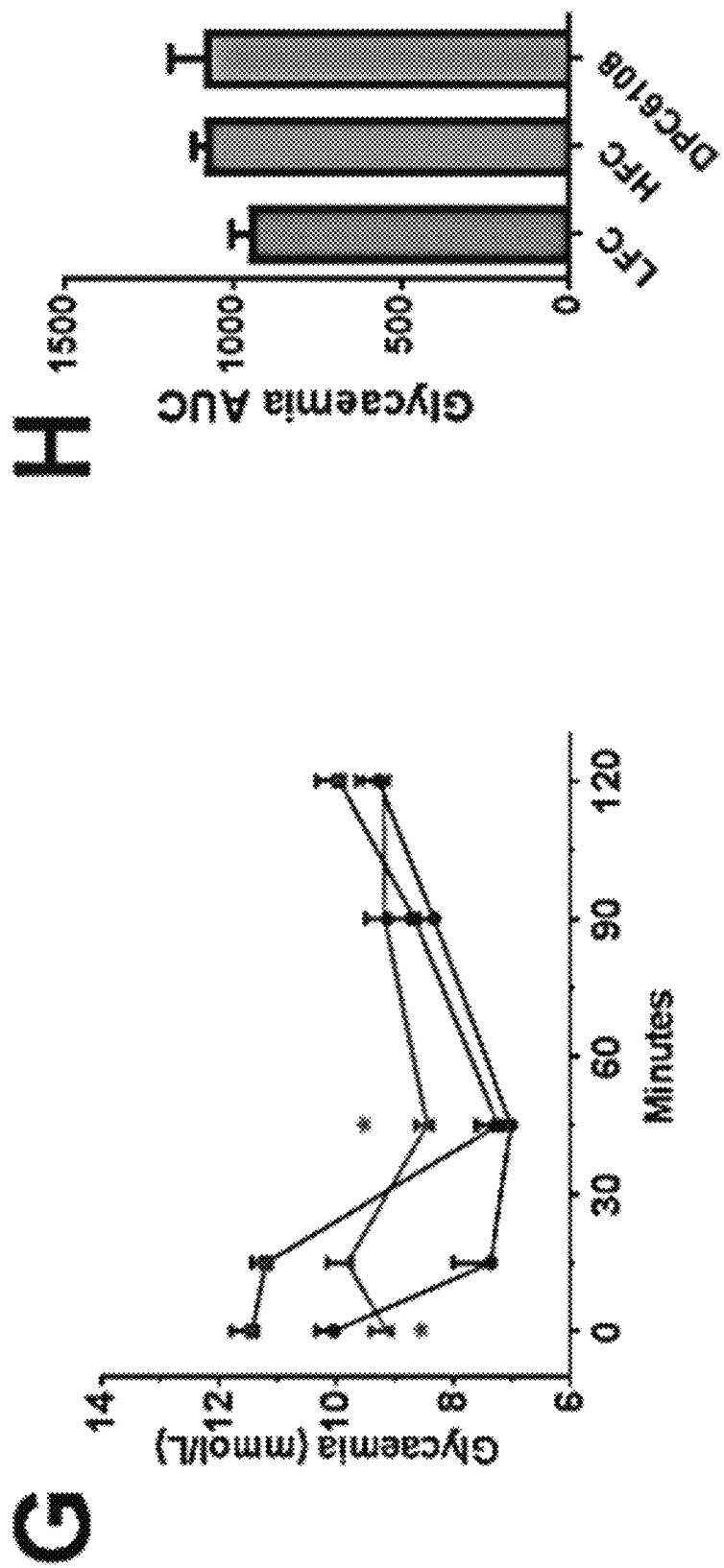
Figure 2:
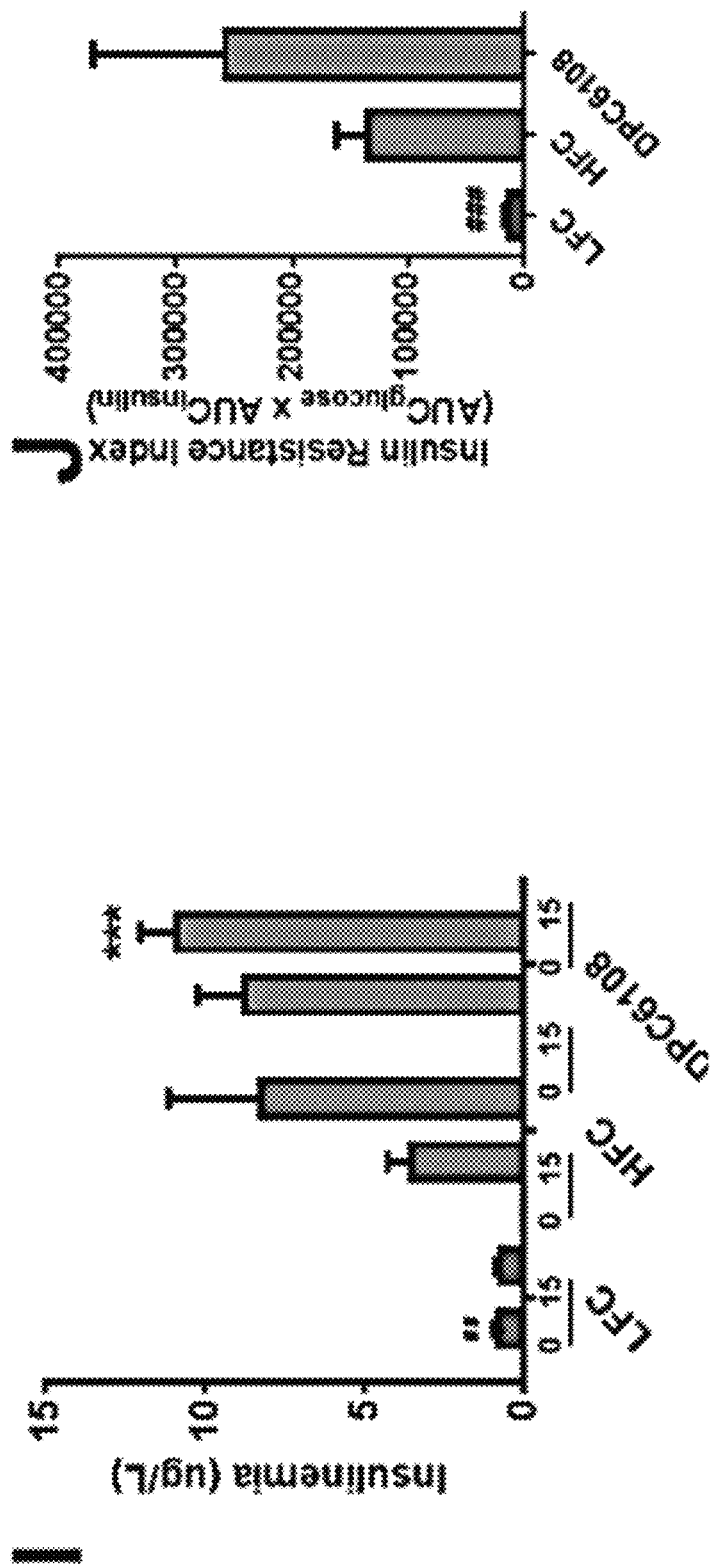
Figure 2:
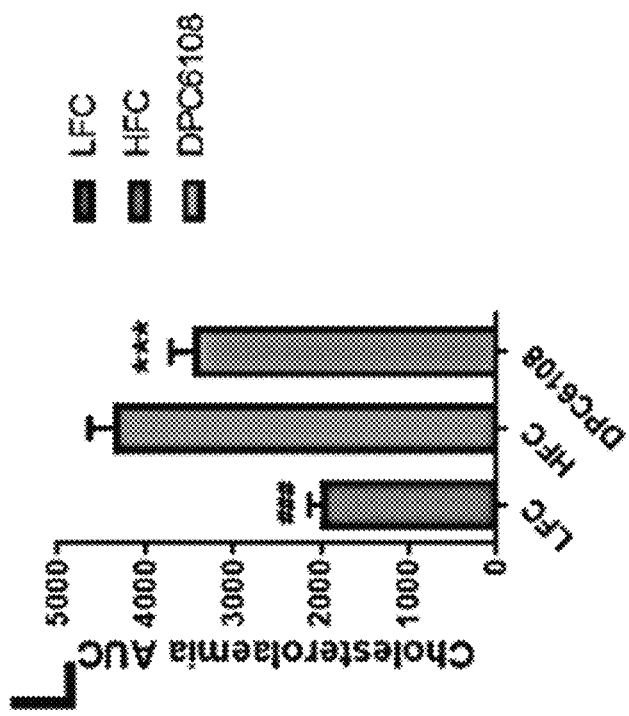
Figure 2:
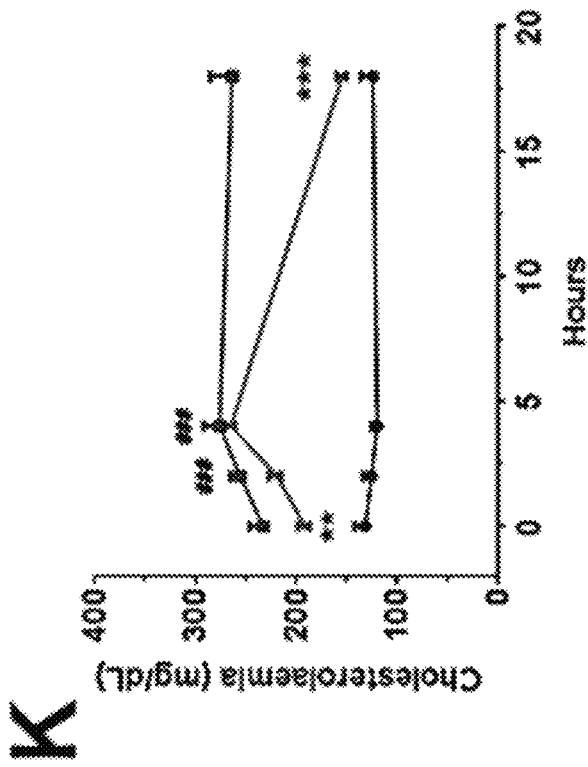

*Lb. brevis* DPC6108 Improved High Fat Diet Induced Impaired Insulin Sensitivity Prior to intervention with the *Lb. brevis* strain, all HF-fed groups (HFC and DPC6108) were initially pre-fed with HF diet (FIG. 1A) and resulting hyperglycaemia and insulin insensitivity was confirmed in the HFC, compared with the LFC (FIGS. 2A-D). After 12 weeks HF pre-feeding, the IP-GTT revealed that HF-fed mice had a higher fasting blood glucose level at T0 ($t_{10}$=2.108 p=0.061; FIG. 2A) and a higher overall area under the curve (AUC) ($t_{6.226}$=10.976, p<0.001; FIG. 2B), compared with the LFC, indicating the disability of HF-fed mice to clear a blood glucose load. Furthermore, after 12 weeks HF pre-feeding, the IP-ITT revealed that HF-fed mice were insensitive to the effects of insulin, following injection of an insulin load, compared with the LFC ($t_{7.364}$=3.783, p=0.006; FIG. 2D). Therefore, 12 weeks of pre-feeding with HF diet was sufficient to induce glucose intolerance (FIGS. 2A and 2B) and insulin insensitivity (FIGS. 2C and 2D) in mice, prior to interventions.

Following an additional 10 weeks feeding in conjunction with intervention (DPC6108), mice were again assessed for their glucose tolerance (FIGS. 2E-2F) and insulin sensitivity (FIGS. 2G-2H). Intervention with DPC6108 had a significant effect on blood glucose levels at T0 (p<0.001) and T45 (p=0.021), along with a trend towards significance at T15 (p=0.052; FIG. 2G).

Plasma was collected during T0 and T15 of the IP-GTT to measure insulin and the subsequent insulin resistance index (FIGS. 2I and 2J). At $T_0$, before glucose load, there was a trend towards significance on plasma insulin as a result of intervention with DPC6108 (p=0.053; FIG. 2I). Insulin production at T15 was significantly higher in the microbial intervention (DPC6108; p<0.001) compared with the HFC (FIG. 2I).

Gaba-Producing *Lb. Brevis* DPC6108 Improved Post-Prandial Cholesterol Metabolism and Increased Luminal Gaba Content of the Distal Small Intestine Assessment of the plasma at $T_0$, prior to meal challenge by mixed meal gavage (MMG) indicated that microbial intervention had a significant impact on fasted plasma cholesterol levels ($F_{2,32}$=6.931, p=0.003; FIG. 2K), compared with the HFC. Post-hoc analysis revealed DPC6108 (p=0.006) reduced cholesterol levels at $T_0$, compared with the HFC (FIG. 2K). No significant impact of intervention on plasma cholesterol was identified at T2 or T4. Following the overnight fast, post-MMG, at T18 it was found that intervention impacted on plasma cholesterol ($F_{2,13.023}$=36.437, p=0.001; FIG. 2K). Again, DPC6108 (p<0.001) reduced cholesterol levels compared with the HFC (FIG. 2K). There was a significant effect overall of microbial intervention on total AUC for plasma cholesterol over each time point throughout the MMG ($F_{2,13.573}$=14.547, p<0.001; FIG. 2L). It was revealed that DPC6108 (p<0.001) significantly reduced cholesterol, compared with the HFC (FIG. 2L).

Figure 3:
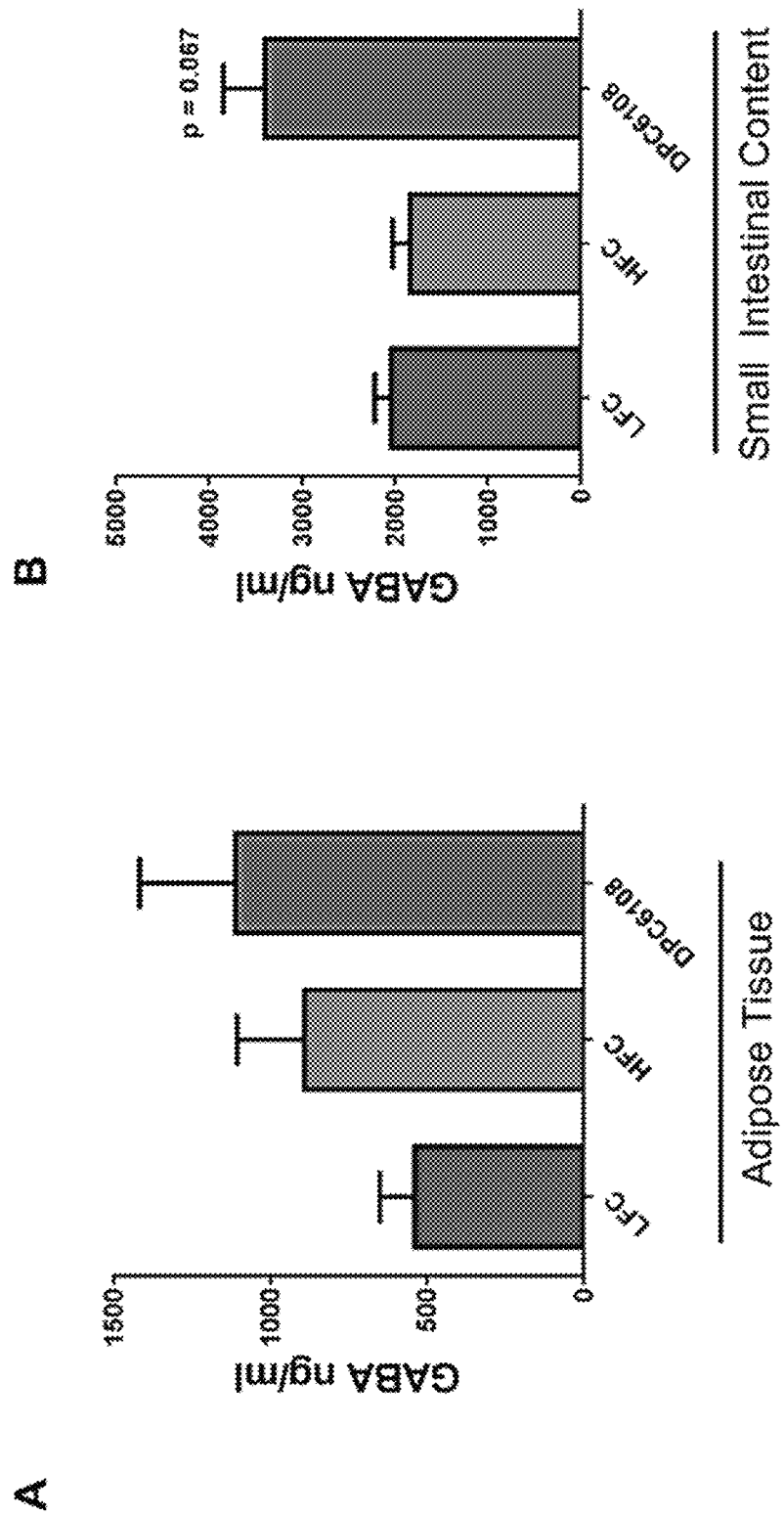
FIGS. 3A and 3B illustrate immune response data and markers of hyperglycaemia. *L. brevis* increases levels of GABA in the intestines of treated mice. GABA concentrations were determined from tissue samples collected at the end of the 12-week intervention from LFC (n=8), HFC (n=12) and DPC6108 (n=14) from epididymal adipose tissue (A) and from LFC (n=10), HFC (n=12) and DPC6108 (n=14) in total small intestinal content (B) collected during sacrifice. Data are expressed as mean±SEM. All data was analysed using the appropriate unpaired student t-test (HFC vs LFC) and one-way analysis of variance (ANOVA). ###$p<0.001$ HFC vs LFC, *$p<0.05$ treatment vs HFC, $p<0.01$ treatment vs HFC and *$p<0.001$ treatment vs HFC. AUC: area under curve, GABA: gamma-aminobutyric acid, HFC: high fat control, DPC6108: *Lb. brevis* DPC6108, LFC: low fat control.

During dissection, the luminal contents of the small intestine, from duodenum to ileum were scraped from the tissue and collected from individual mice. Diet had no impact on either adipose tissue ($t_{15.738}$=1.522) or small intestinal content ($t_{20}$=−0.898) of GABA, between the HFC and LFC groups (FIGS. 3A and 3B). This was unsurprising as both diets were matched controls and contained the same amino acid profiles. Intervention with DPC6108 had a tendency to increase luminal contents of GABA (p=0.067) in the small intestine compared with the HFC (FIG. 3B).

Microbial Intervention Altered Host Amino Acid and Biogenic Amine Metabolism

Figure 4:
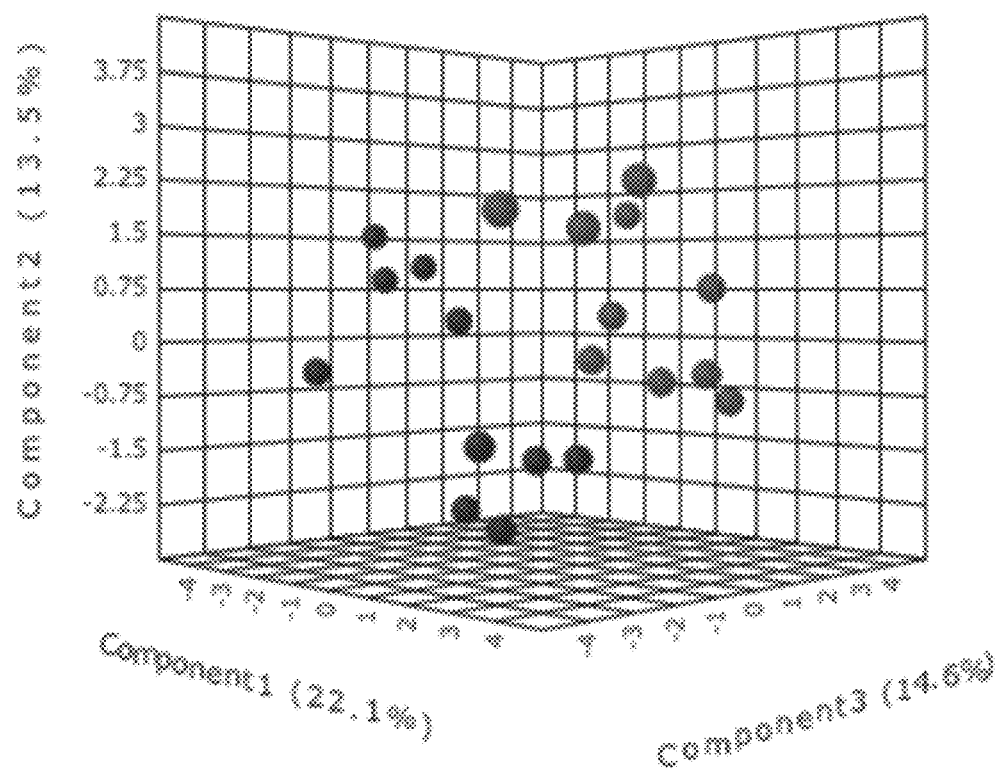
FIG. 4A-D illustrate cholesterol metabolism and GABA concentration data. *L. brevis* has an effect on host amino acid and biogenic amine metabolism. Microbial intervention has an effect on host amino acid and biogenic amine metabolism. Sparse partial least square discriminant analysis (sPLS-DA) plot displays HFC (n=10; red) and DPC6108 (n=10; green) samples. (B) Plot metabolite loadings graph displaying key metabolite differences between groups *(q<0.05 treatment vs HFC. Quantitative data is displayed for the metabolites which were significantly altered by DPC6108; this includes the biogenic amine ornithine (C) and amino acid arginine (D).*(q<0.05 treatment vs HFC, q<0.01 treatment vs HFC and *q<0.01 treatment vs HFC. Plots depict individual replicates with (n=10) with mean and SEM.
Figure 4:
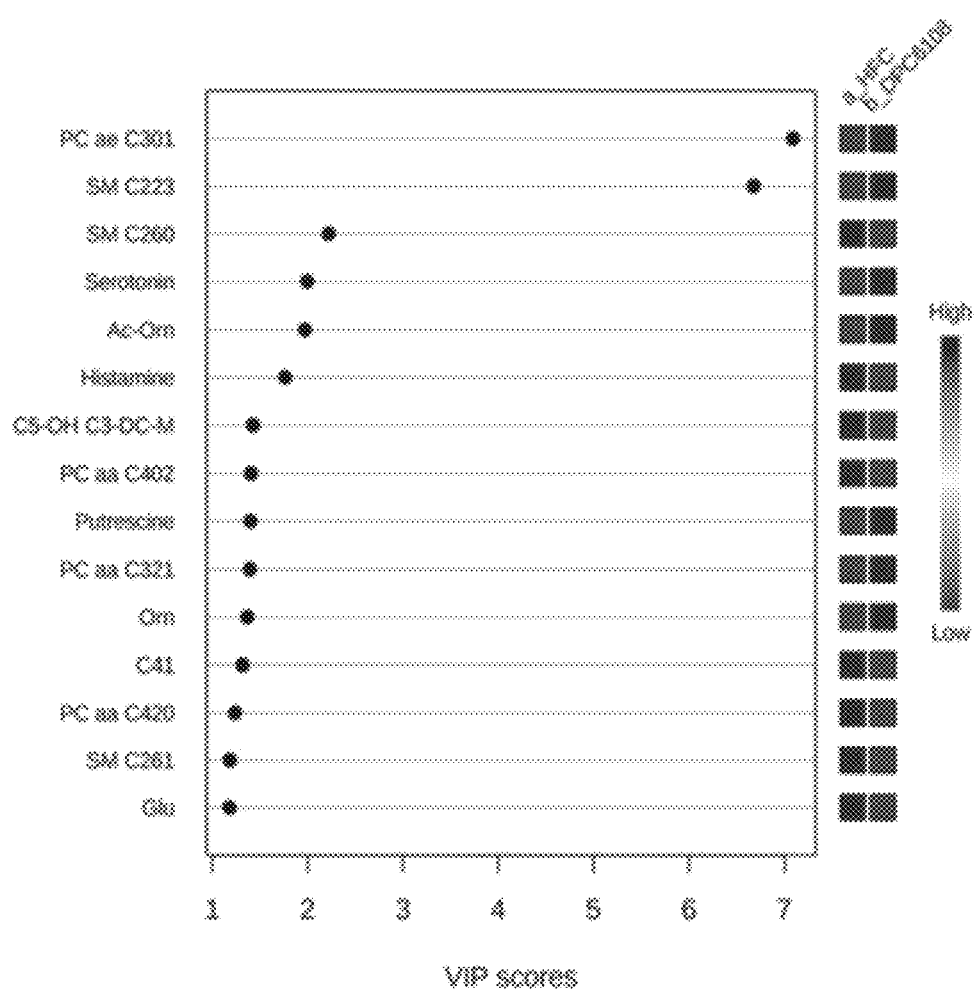
Figure 4:
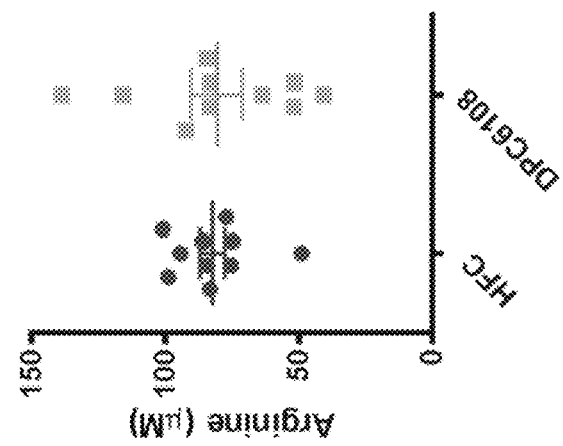
Figure 4:
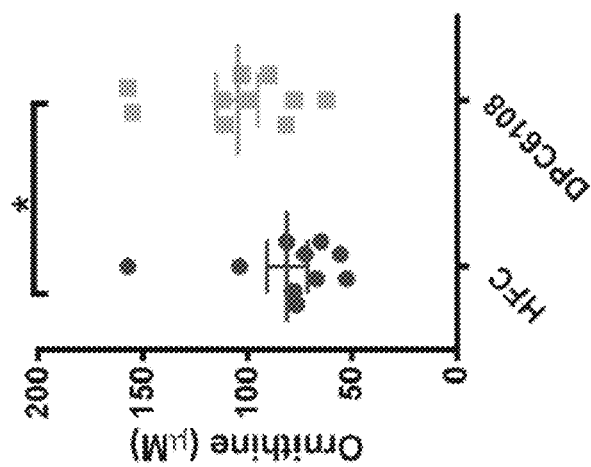

Targeted analysis of the fasted mouse plasma metabolome unveiled metabolic alterations as a result of microbial intervention. FIG. 4A depicts a sparse partial least square discriminant analysis (sPLS-DA) plot, with the metabolites most important to the model displayed in the loadings plot (FIG. 4B). Microbial intervention with DPC6108 had a modest effect on the plasma metabolome, increasing the biogenic amine ornithine (q<0.05), compared with the HFC (FIG. 4C).

DPC6108 Showed Higher Microbiome Diversity Compared to the HFC Group

A total of 64 faecal samples were subjected to 16S metagenomic analysis. Illumina sequencing generated a total of 2,560,853 high quality sequences. After rarefying the sequencing depth, Chao 1 diversity index and observed OTU were calculated (Table 2).

TABLE 2

Alpha (Chao-1, numbers of observed OTUs) and Beta (Bray-Curtis) diversity indexes are shown as mean values ± standard deviation. Different letters indicate a significant difference (p < 0.05).

|  | Chao_1 | OTUs (n) | Bray-Curtis |
| --- | --- | --- | --- |
| LFC | 4397 ± 621$^a$ | 2501 ± 383$^a$ | 0.36 ± 0.06$^a$ |
| HFC | 3599 ± 576$^b$ | 1943 ± 330$^b$ | 0.41 ± 0.06$^b$ |
| DPC6108 | 4138 ± 720$^a$ | 2238 ± 494$^{a,b}$ | 0.42 ± 0.09$^{b,d}$ |
| DSM32386 | 3375 ± 487$^b$ | 1857 ± 328$^b$ | 0.44 ± 0.08$^{c,d}$ |

Figure 5:
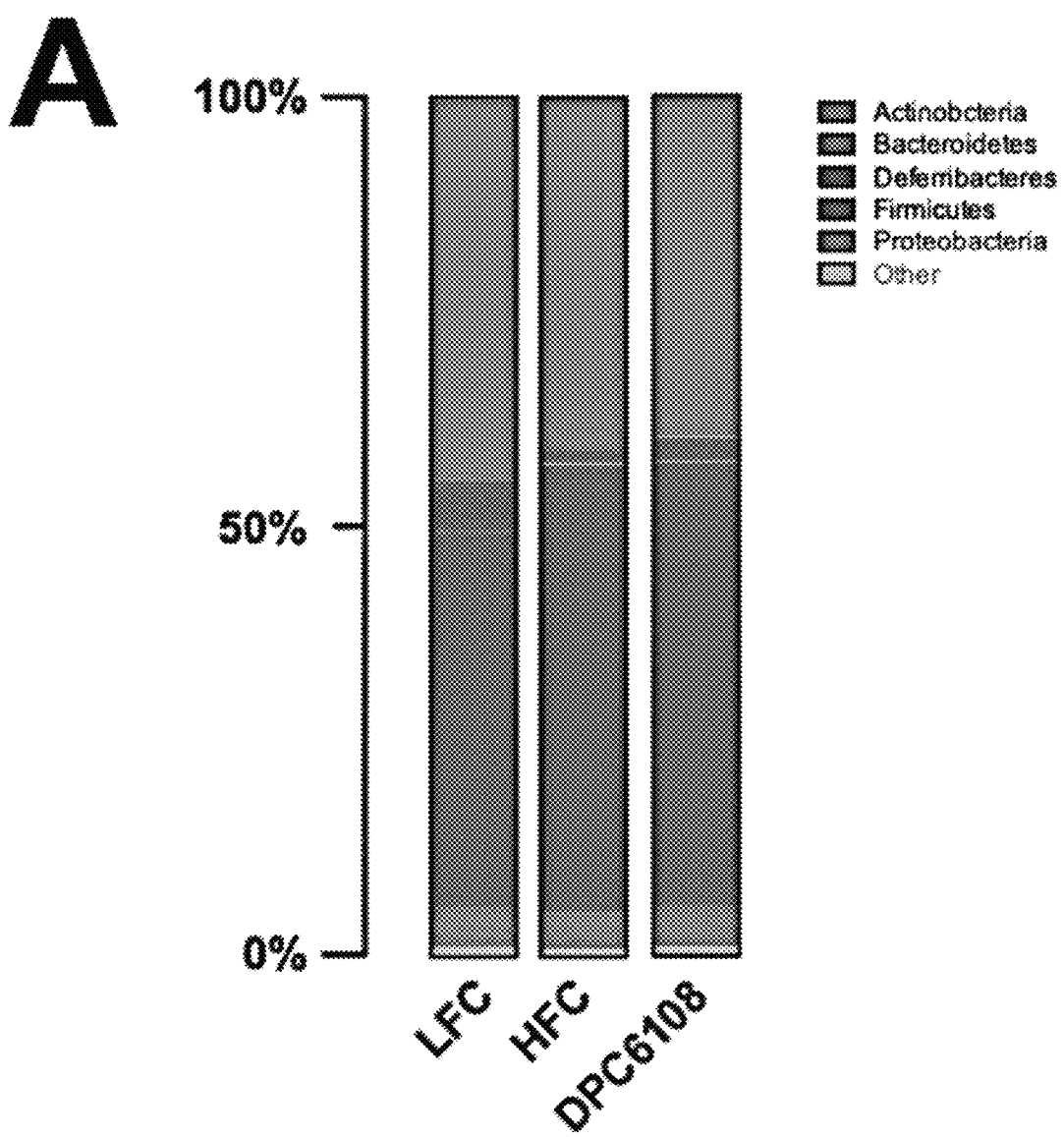
FIG. 5A-E illustrate that both diet and *Lb. brevis* intervention have a significant impact on gut microbiome composition. Relative abundance of microbial taxa at (A) phylum and (B) genus level. Phyla and genera representing <0.1% abundance in any sample were considered as Other. Principal component analysis (PCA) based on OTU relative abundances of the bacterial community and the metabolic parameters measured in mice (C). The first two principal coordinates (PC1 and PC2) are plotted for each sample, (D) with the variables related to the variance between groups. Correlation between the fecal microbiota and glycaemia during IP-GTT, glycaemia during IP-ITT, insulin or cholesterol levels in the blood (E). Green arrows indicate a negative correlation, while red arrows indicate a positive correlation (p<0.05). The dash indicates no significant correlation (p>0.05).
Figure 5:
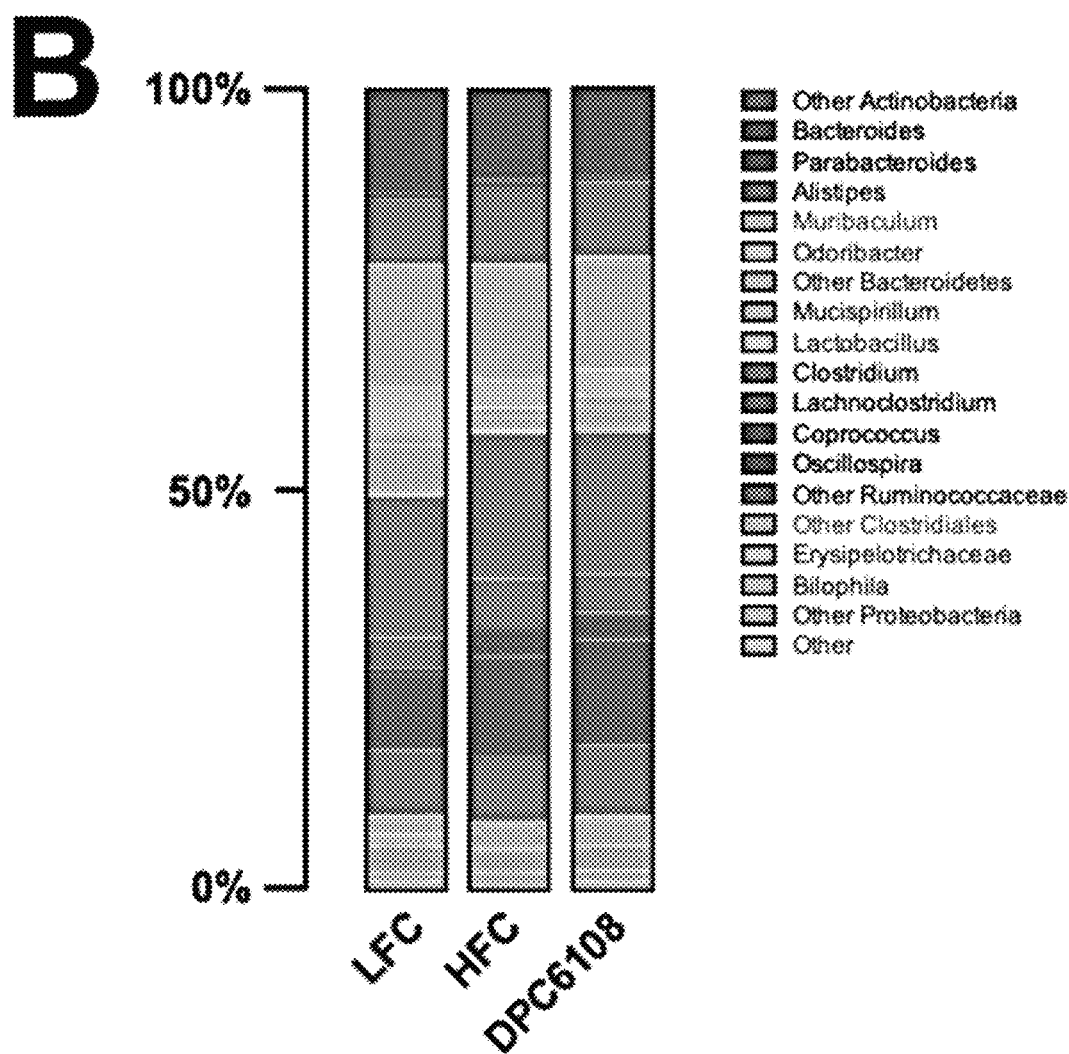
Figure 5:
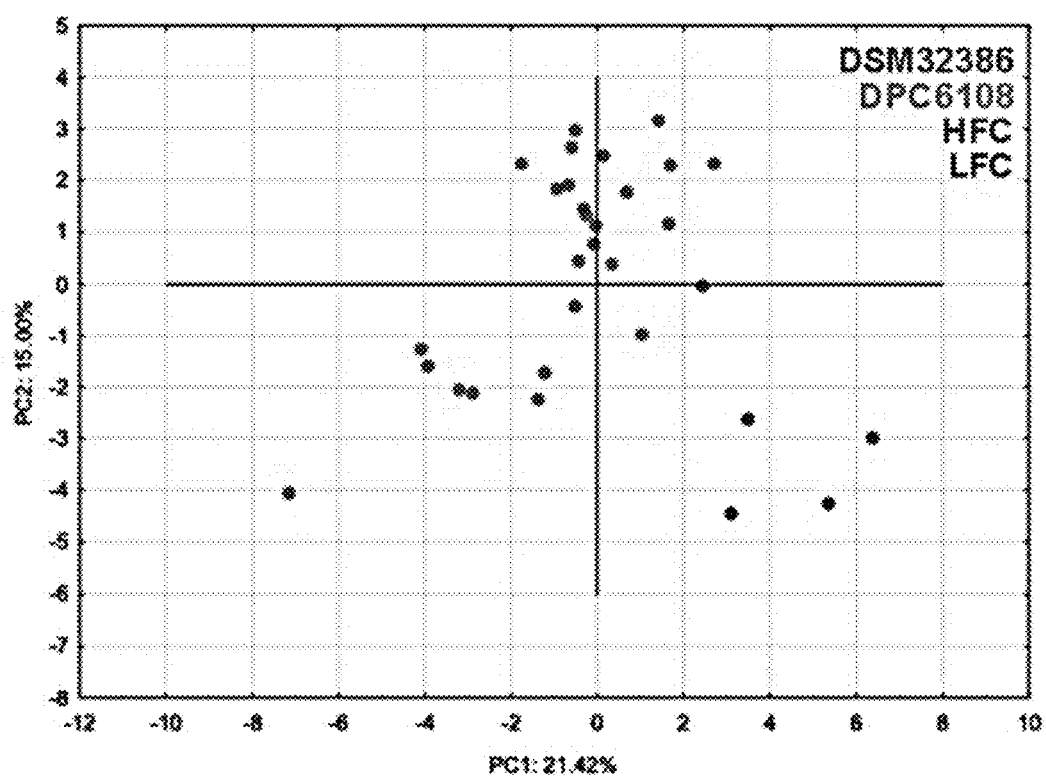
Figure 5:
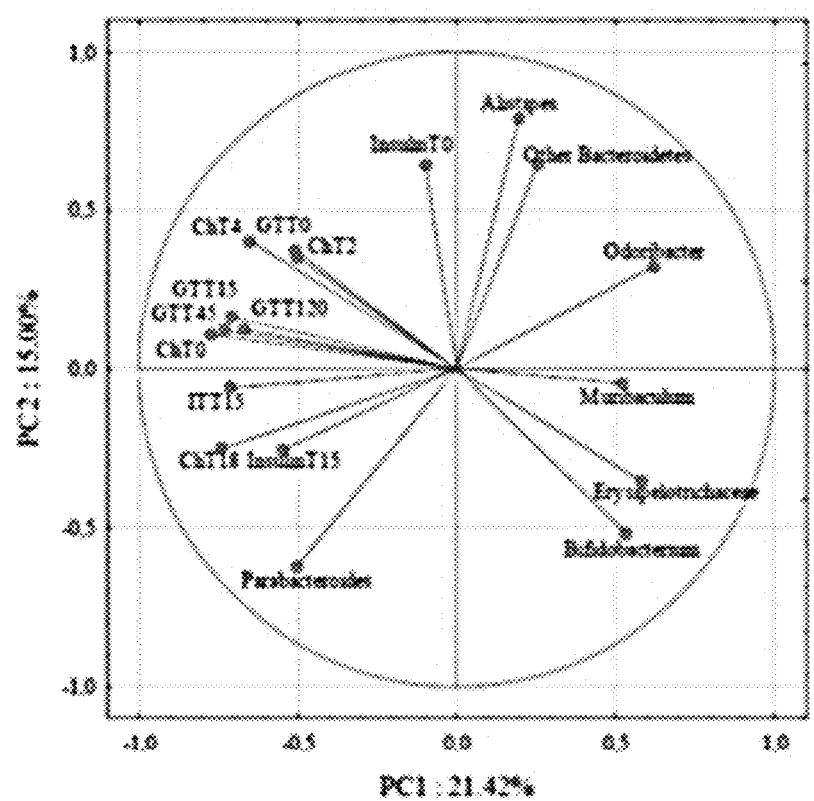
Figure 5:
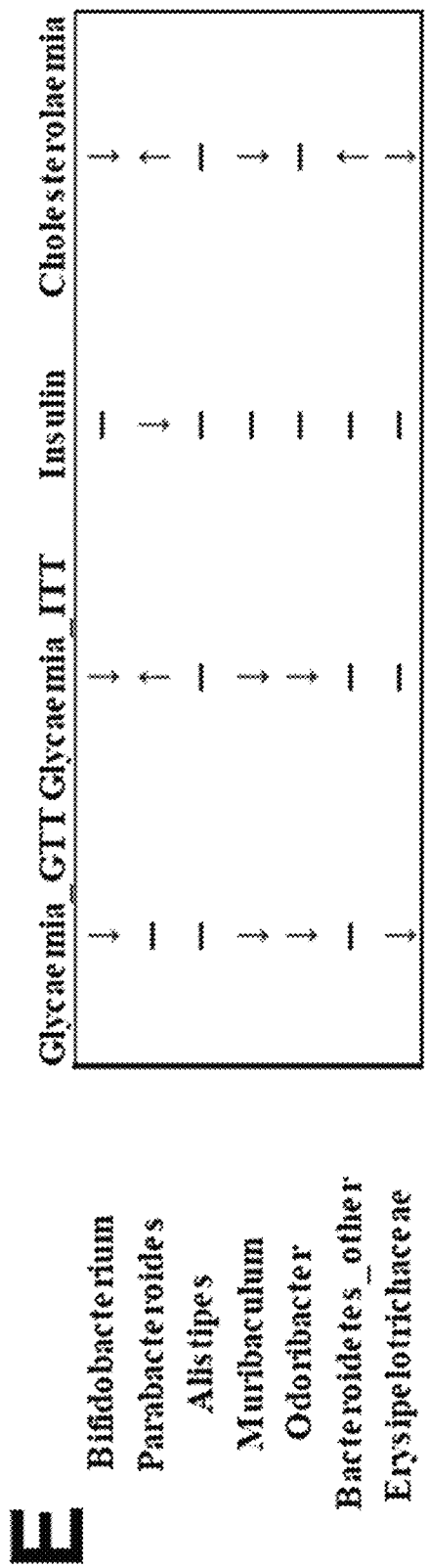

Chao 1 index showed a significantly higher diversity in LFC (mean value=4,397.0) and DPC6108 (mean value=4,138.5) groups (p<0.005) compared to the other groups. Moreover, DPC6108 showed higher diversity compared to the HFC group. The data show that there is a significant difference in the richness (as indicated by the observed OTU) with reduced numbers of OTUs in HF-treated groups compared to the LFC group, although the number of OTUs was increased in the DPC6108 group compared to the HFC. To assess whether there was any significant difference in beta-diversity between the four groups, Bray-Curtis distance matrix was calculated and significant differences were found between all groups (p<0.05) (Table 2). The relative abundance of phyla present in both control and treated groups was determined from the rarefied dataset and compared for statistical significance. At phylum level, all groups had the same microbial composition (FIG. 5A). In LFC group, Firmicutes (43.8%) and *Bacteroidetes* (44.3%) were dominant (ratio Firmicutes/*Bacteroides*=0.98). The phylum Deferribacteres (6.1%) was significantly higher compared to the other groups. A significant reduction of Deferribacteres (1.7%) and increase of Firmicutes (52.3%) was observed in the HFC group, compared to the LFC (p<0.01). HFC and bacteria-treated groups showed a similar relative abundance of Firmicutes and *Bacteroidetes* (ratio Firmicutes/*Bacteroides*, HFC=1.28, DPC6108=1.30), but different relative abundance of Deferribacteres, which was higher in HF-treated groups (2.9% in DPC6108), compared to the HFC group (1.7%). Proteobacteria did not show any significant difference amongst groups, and was present at 4.4% in all groups. (FIG. 5A). Interestingly, the genus *Akkermansia* was present in the LFC (0.02%) and HFC group (0.01%) (p<0.0001), but absent in both microbial-treated groups. Higher abundance of *Odoribacter* (6.02%) and lower abundance of *Lachnoclostridium* (3.57%) were detected in the LFC group, compared to the other groups (p<0.001). *Oscillospira* and *Clostridiales*_other were found to be significantly higher in all high-fat diet groups (p<0.005) compared to the LFC group (1.17%, 9.07%, 2.43%, respectively). All sequences associated to the genus *Lactobacillus* were blasted manually on the NCBI BLAST: Basic Local Alignment Search Tool, and the species *Lb. brevis* was detected only in the DPC6108 group.

*Bifidobacterium*, *Erysipelotrichaceae*, *Muribaculum* and *Odoribacter* are Related to Reduced Glycaemia and Cholesterolaemia A correlation matrix and PCA analysis of 30 individual mice were generated based on the relative microbial composition and metabolic parameters, showing that there were differences between the groups. The correlation matrix showed that the increase of some microbial species corresponded to the improvement or worsening of glycaemia (after IP-GTT or IP-ITT), insulin or cholesterol levels (FIG. 5E). The PCA scores clearly separated the LFC from the high-fat diet groups, with the DPC6108 group clustering in one area clearly separated from the HFC (FIG. 5C). PCA1 and PCA2 explained the 21.42% and 15.0% of variance between groups, respectively. The variance associated to the LFC group was related to *Erysipelotrichaceae*, *Muribaculum* and *Bifidobacterium* on PCA1 (|loadings|≥0.52), and *Bifidobacterium* on PCA2 (|loadings|≥0.52). The variance associated to the group DPC6108 was related to *Odoribacter*, cholesterol (T0, T2 and T4), glycaemia under IP-GGT (at time 0, 15, 45, 120 min) on PCA1 (|loadings|≥0.50) and *Alistipes*, other *Bacteroidetes*, and resting insulin on PCA2 (|loadings|≥0.64), apart from four samples belonging to the DPC6108 (FIG. 5D).

Figure 6:
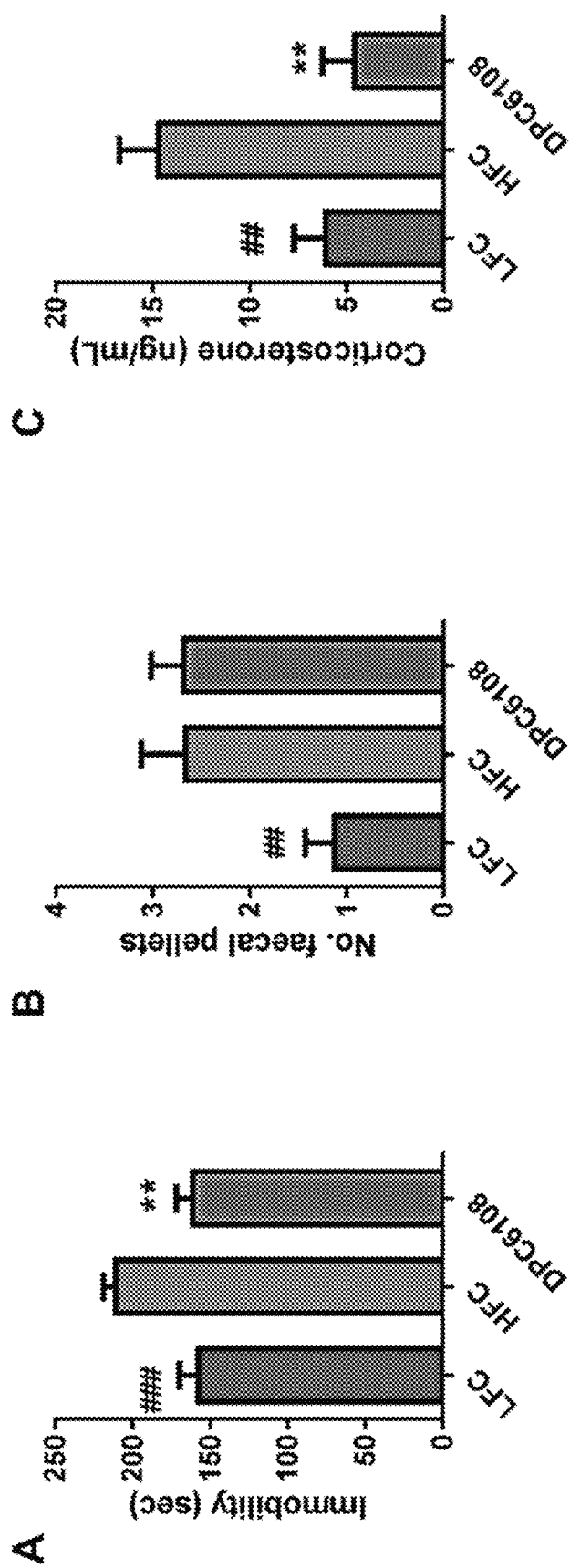
FIG. 6A-C illustrate that *L. brevis* improves symptoms of depressive-like behaviour in the forced swim test and resting corticosterone levels. The effect of high fat diet feeding and probiotic interventions on depressive-like behaviour and the hypothalamic-pituitary adrenal (HPA) axis response to stress was assessed after 20 weeks of feeding/week 8 of intervention. Despair behaviour was assessed through immobility time (A) by mice throughout the test and anxiety-like behaviour was assessed through the number of faecal pellets produced during the test (B). Plasma was used to measure corticosterone production (C). Samples were collected from mice in LFC (n=13), HFC (n=12) and DPC6108 (n=11). All data was analysed using the appropriate unpaired student t-test (HFC vs LFC) and one-way analysis of variance (ANOVA). ##p<0.001 HFC vs LFC and ###p<0.001 HFC vs LFC, **p<0.01 treatment vs HFC. FST: forced swim test, HFC: high fat control, DPC6108: *L. brevis* DPC6108, LFC: low fat control.
Figure 7:
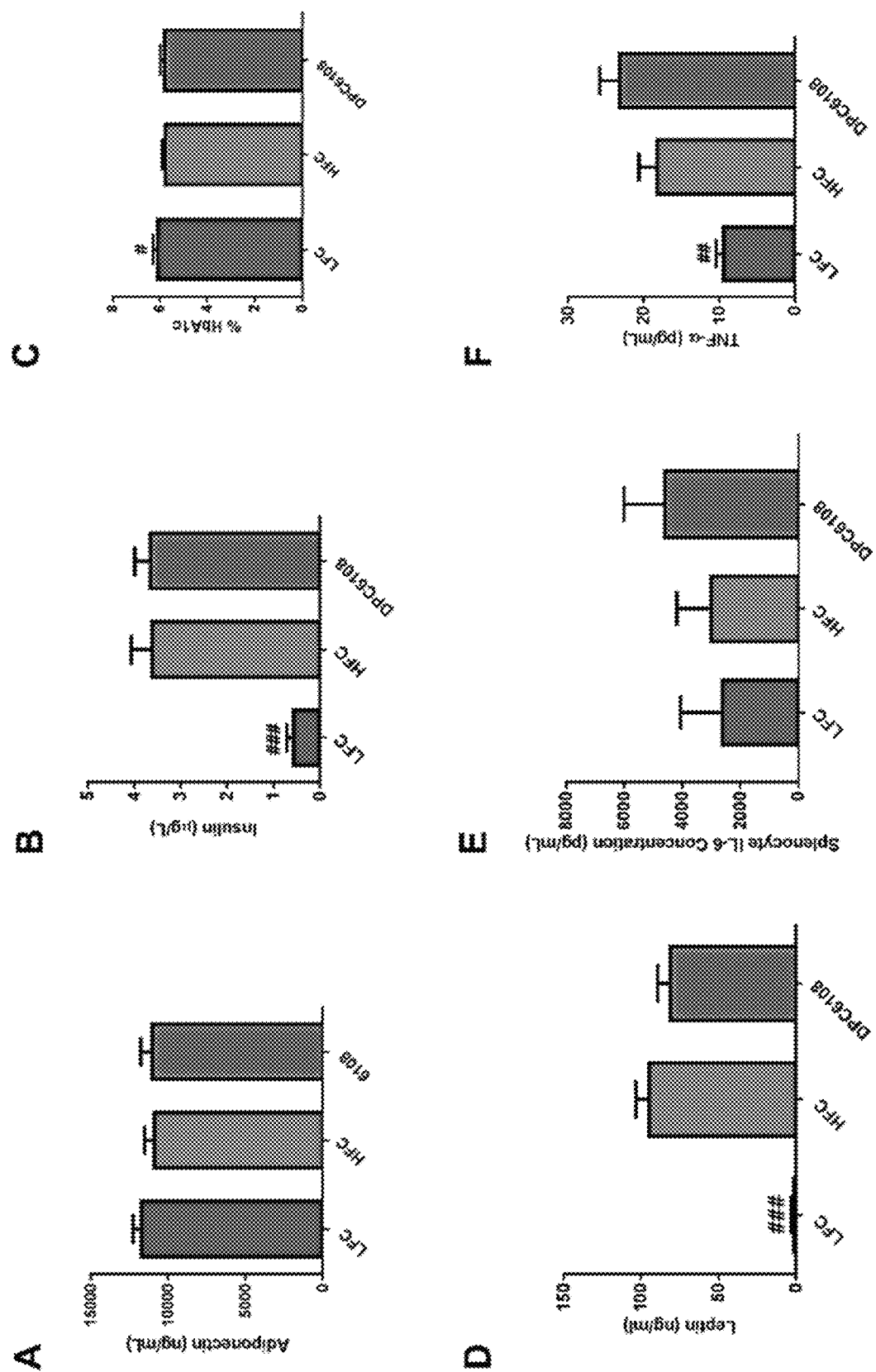
FIG. 7A-F illustrates *L. brevis* reduces fasted metabolic markers associated with hyperglycaemia and glucose intolerance. Metabolic markers were calculated for n=8-14 per group, depending on plasma variable. Fasted levels of adiponectin (7A), insulin (7B), % HbA1c (7C), leptin (7D), splenocyte IL-6 (7E) and TNF-α (7F) detected in plasma isolated after 12-weeks of intervention. Data are expressed as mean±SEM. All data was analysed using the appropriate unpaired student t-test (HFC vs LFC) and one-way analysis of variance (ANOVA). #p<0.001 HFC vs LFC, ##p<0.001 HFC vs LFC and ###p<0.001 HFC vs LFC, *p<0.05 treatment vs HFC, p<0.01 treatment vs HFC and *p<0.001 treatment vs HFC. HFC: high fat control, DPC6108: *L. brevis* DPC6108, LFC: low fat control.

*Lb. brevis* Intervention Improves Depressive-Like Behaviour and Basal Corticosterone During the Forced Swim Test Diet and bodyweight had a significant impact on immobility time during the forced swim test (FST). Mice in the HFC group spent more time immobile, compared to their LFC counterparts ($t_{21}$=4.245, p=0.0004; FIG. 6A). While it was hypothesised that obesity itself impaired mobility of the HFC mice, data from the NOR OF test would suggest that bodyweight had no significant effect on movement (FIG. 8). Therefore, depressive-like behaviour was induced through consumption of a high-fat diet. Microbial intervention had a significant impact on immobility time during the FST ($F_{2,37}$=22.349, p=0.000; FIG. 6A), compared with the HFC. Post-hoc analysis revealed that intervention with DPC6108 (p<0.01) reduced the duration of time spent immobile during the FST, compared with the HFC (FIG. 6A). In addition, the HFC group produced more faecal pellets during the FST ($t_{24}$=3.021, p=0.0059; FIG. 6B), compared with the LFC, indicative of enhanced experience of anxiety during the test. Furthermore, microbial intervention had a significant effect on the number of faecal pellets produced during the FST ($F_{2,40}$=7.972, p=0.001; FIG. 6B), compared with the HFC.

Plasma was isolated from individual mice prior to and during the FST to identify the impact, if any, of obesity and microbial intervention on the hypothalamic-pituitary-adrenal (HPA) axis response to stress. Basal corticosterone levels were significantly increased in the HFC group, compared with the LFC ($t_{23}$=3.619, p=0.0014; FIG. 6C). Interestingly, microbial intervention restored basal corticosterone to levels comparable with the LFC and prevented high fat dietary stimulation of the HPA axis and the stress response ($F_{2,36}$=16.110, p<0.0001; FIG. 6C). Intervention with DPC6108 (p<0.01) significantly reduced basal corticosterone levels, compared with the HFC (FIG. 6C).

Discussion

Rising incidences in the diagnoses of type-1 and type-2 diabetes is a cause for concern. With scientific breakthroughs now emerging in adjunct, microbial therapeutics for the treatment of diabetes by probiotic manipulation of the gut microbiota appears to be at the forefront of a new era of preventative natural medication. The current study demonstrates that daily administration of *Lactobacillus brevis* improves insulin sensitivity and glucose tolerance in a diet-induced obesity rodent model.

The results demonstrated that 12 weeks of high fat feeding was sufficient to induce glucose intolerance and insulin insensitivity, as a preclinical representation of T2D, in otherwise healthy mice. Microbial intervention improved glucose homeostasis. During the glucose tolerance test, the group supplemented with Lb. brevis secreted significantly more insulin in response to glucose load (plasma taken 15 min after glucose injection). This suggests an increase in the sensitivity of the endocrine response to promote glucose clearance.

Although there were no differences in the final bodyweight gain between the high-fat groups, microbial intervention had a significant effect on the distribution of fat. Interestingly, the DPC6108 treated group accumulated less mesenteric adipose tissue compared with high-fat control. The anti-diabetic effects of Lb. brevis could be mediated though maintenance of adipose tissue-immune homeostasis through re-distribution of fat in the host. DPC6108 also reduced percentage body fat mass compared to the high-fat control. The Lb. brevis GABA-producing strain was also associated with a reduction in fasting total plasma cholesterol levels and an overall improvement in post-prandial cholesterolaemia.

The data presented herein demonstrated that the high-fat diet induced changes in microbial composition at gastrointestinal level, significantly increasing Firmicutes, with a stable abundance of Bacteroidetes in the HFC and in the microbe-treated group. As consequence, the ratio of Firmicutes to Bacteroidetes was increased following high-fat diet consumption and Lb. brevis did not mitigate this change. It has been shown that low Firmicutes to Bacteroidetes ratios are associated with reduced blood glucose levels or increased glucose tolerance. Indeed, the data presented herein shows that the LFC group (lower ratio Firmicutes to Bacteroides) had better glucose tolerance compared to the HFC group (higher ratio Firmicutes to Bacteroides). Actinobacteria decreased in all high-fat groups compared to LFC group. Deferribacteres significantly decreased following high-fat diet consumption and Lb. brevis did not significantly reverse that change.

Lb. brevis improved high-fat diet induced behavioural deficits in depression-related behaviour as observed in the forced swim test. Furthermore, basal levels of the stress hormone corticosterone taken before the induction of acute stress were significantly reduced following Lb. brevis intervention, compared with the high-fat control.

The data arising from this study provide supporting information on the role of metabolic- and neuro-active-microbial metabolites in the modulation of diet-induced obese metabolic and behavioural abnormalities. Supplementation with GABA-producing Lb. brevis can increase endogenous GABA concentrations in the small intestine with an impact on many health outcomes. Microbial modulation of the gut microbiota is a safe and effective means to modulate and improve health outcomes in the host. This dataset describes that increased microbially-produced GABA in the small intestine can impact on metabolism and behaviour.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

REFERENCES

BILBO, S. D. & TSANG, V. 2010. Enduring consequences of maternal obesity for brain inflammation and behavior of offspring. FASEB J, 24, 2104-15.

DESBONNET, L., GARRETT, L., CLARKE, G., BIENENSTOCK, J. & DINAN, T. G. 2008. The probiotic Bifidobacteria infantis: An assessment of potential antidepressant properties in the rat. J Psychiatr Res, 43, 164-74.

DESBONNET, L., GARRETT, L., CLARKE, G., KIELY, B., CRYAN, J. F. & DINAN, T. G. 2010. Effects of the probiotic Bifidobacterium infantis in the maternal separation model of depression. Neuroscience, 170, 1179-88

MARQUES, T. M., PATTERSON, E., WALL, R., O'SULLIVAN, O., FITZGERALD, G. F., COTTER, P. D., DINAN, T. G., CRYAN, J. F., ROSS, R. P. & STANTON, C. 2016. Influence of GABA and GABA-producing Lactobacillus brevis DPC 6108 on the development of diabetes in a streptozotocin rat model. Benef Microbes, 7, 409-20.

PELEG-RAIBSTEIN, D., LUCA, E. & WOLFRUM, C. 2012. Maternal high-fat diet in mice programs emotional behavior in adulthood. Behav Brain Res, 233, 398-404.

SASAKI, A., D E VEGA, W. C., ST-CYR, S., PAN, P. & MCGOWAN, P. O. 2013. Perinatal high fat diet alters glucocorticoid signaling and anxiety behavior in adulthood. Neuroscience, 240, 1-12.

The invention claimed is:

1. A method of weight management, the method comprising administering to a subject in need of weight management a composition comprising an isolated bacteria *Lactobacillus brevis* DPC6108, or variants thereof.

2. The method of claim 1, in which the isolated bacteria, or variant thereof, is in the form of live cells, dead cells, cellular components, cell extracts, or cell lysates.

3. The method of claim 1, in which the isolated bacteria is characterised by a 16s rRNA sequence of SEQ ID NO: 1.

4. The method of claim 1, in which the composition is in the form of a product formulated for human ingestion.

5. The method of claim 1, wherein the composition is in the form of a food product, a drink, a food supplement, or a medicament.

6. The method of claim 1, wherein the composition further comprises a source of glutamate.

7. The method of claim 1, in which the composition is administered daily to a subject in need thereof at a concentration of $1 \times 10^{10}$ CFU/ml/day.

8. The method of claim 1, in which the composition is administered to an individual orally and forms part of the individual's microbiota.

9. The method of claim 1, in which the composition is administered to an individual orally and forms part of the individual's microbiota, wherein the composition further comprises a carrier and is in the form of a tablet, a capsule, a powder, granules, microparticles or nanoparticles and the carrier is optionally configured for targeted or controlled release in the intestine.

10. The method of claim 1, wherein the isolated bacteria *Lactobacillus brevis* DPC6108 strain is viable or non-viable.

11. The method of claim 1, wherein the composition is an extract or a supernatant derived from the isolated bacteria *Lactobacillus brevis* DPC6108 strain.

\* \* \* \* \*